US012556023B2

(12) United States Patent
Wagoner et al.

(10) Patent No.: US 12,556,023 B2
(45) Date of Patent: Feb. 17, 2026

(54) MODULAR BATTERY PACK SYSTEM WITH MULTI-VOLTAGE BUS

(71) Applicant: Joule Case Inc., Seattle, WA (US)

(72) Inventors: James Wagoner, Seattle, WA (US); Alexander Livingston, Seattle, WA (US)

(73) Assignee: Joule Case Inc., Seattle, WA (US)

( * ) Notice: Subject to any disclaimer, the term of this patent is extended or adjusted under 35 U.S.C. 154(b) by 0 days.

(21) Appl. No.: 18/602,940

(22) Filed: Mar. 12, 2024

(65) Prior Publication Data

US 2024/0413662 A1    Dec. 12, 2024

Related U.S. Application Data

(63) Continuation of application No. 17/357,680, filed on Jun. 24, 2021, now abandoned, which is a (Continued)

(51) Int. Cl.
*H02J 7/00* (2006.01)
*H01M 10/48* (2006.01)
(Continued)

(52) U.S. Cl.
CPC ..... *H02J 7/007184* (2020.01); *H01M 10/482* (2013.01); *H01M 10/486* (2013.01);
(Continued)

(58) Field of Classification Search
CPC ........ H02J 7/007184; H02J 1/001; H02J 3/38; H02J 7/00714; H02J 7/007182; H02J 3/40; H02J 7/36; H01M 10/482; H01M 10/486; H01M 50/204; H01M 50/296; H01M 50/267; Y02P 70/50; Y02E 60/10
See application file for complete search history.

(56) References Cited

U.S. PATENT DOCUMENTS 6,027,828 A   2/2000  Hahn
7,535,122 B2  5/2009  Visairo-Cruz
(Continued)

FOREIGN PATENT DOCUMENTS

CN    108258773 A    7/2018
CN    208257438 U    12/2018
(Continued)

OTHER PUBLICATIONS

AU Examination Report No. 1 dispatched Nov. 23, 2021 for AU Application No. 2019298994, a counterpart application of U.S. Appl. No. 17/357,680, 5 pgs.
(Continued)

*Primary Examiner* — Adam A Arciero
(74) *Attorney, Agent, or Firm* — Bryan A. Santarelli; FisherBroyles, LLP

(57) ABSTRACT

A method and system provide a plurality of power cell modules. The power cell modules can be stacked together such that they are electrically connected and share a collective multi-voltage bus. Electronic appliances can be connected to one of the power cell modules to be powered by all of the connected power cell modules. Power cell modules can be easily added or removed from the bank without interrupting the supply of power to the electronic appliance.

13 Claims, 13 Drawing Sheets

Related U.S. Application Data continuation of application No. 16/706,057, filed on Dec. 6, 2019, now Pat. No. 11,081,746, which is a continuation of application No. 16/443,266, filed on Jun. 17, 2019, now Pat. No. 11,177,520.

(60) Provisional application No. 62/693,230, filed on Jul. 2, 2018.

(51) Int. Cl.
| | |
|---|---|
| *H01M 50/204* | (2021.01) |
| *H01M 50/296* | (2021.01) |
| *H02J 1/00* | (2006.01) |
| *H02J 3/38* | (2006.01) |
| *H02J 3/40* | (2006.01) |

(52) U.S. Cl.
CPC ....... *H01M 50/204* (2021.01); *H01M 50/296* (2021.01); *H02J 1/001* (2020.01); *H02J 3/38* (2013.01); *H02J 7/00714* (2020.01); *H02J 7/007182* (2020.01); *H02J 3/40* (2013.01)

(56) References Cited

U.S. PATENT DOCUMENTS

| | | |
|---|---|---|
| 8,288,035 B2 | 10/2012 | Li |
| 9,040,187 B2 | 5/2015 | Bhardwaj |
| 9,269,993 B2 | 2/2016 | Khaitan |
| 9,385,351 B2 | 7/2016 | Workman |
| 9,705,121 B2 | 7/2017 | Fuhr |
| 9,819,060 B2 | 11/2017 | O'Hora |
| 9,912,015 B2 | 3/2018 | O'Hora |
| 10,103,411 B2 | 10/2018 | Giordano |
| 2006/0210841 A1 | 9/2006 | Wallace |
| 2007/0062744 A1 | 3/2007 | Weidenheimer |
| 2009/0085553 A1 | 4/2009 | Kumar |
| 2009/0146610 A1 | 6/2009 | Trigiani |
| 2011/0140526 A1 | 6/2011 | Weidenheimer |
| 2012/0040221 A1 | 2/2012 | Stoughton |
| 2012/0068715 A1 | 3/2012 | Martaeng |
| 2012/0161524 A1 | 6/2012 | Weidenheimer |
| 2017/0033337 A1 | 2/2017 | O'Hora |
| 2017/0069900 A1 | 3/2017 | Casebolt |
| 2018/0241236 A1 | 8/2018 | Vasefi |
| 2018/0361873 A1 | 12/2018 | Damus |
| 2019/0195942 A1 | 6/2019 | Cheon |

FOREIGN PATENT DOCUMENTS

| | | |
|---|---|---|
| WO | 2017023869 A1 | 2/2017 |
| WO | 2017024105 A1 | 2/2017 |
| WO | 20170151057 W | 9/2017 |

OTHER PUBLICATIONS

Chen, et al., "A Modular and Reconfigurable Battery System," IEEE, Applied Power Electronics Conference and Exposition, 2017, pp. 2131-2135.

CN Office Action mailed Oct. 9, 2023 for CN Application No. 201980057072, a counterpart application of U.S. Appl. No. 18/602,940, 10 pgs.

International Search Report & Written Opinion mailed Oct. 16, 2019 for Application No. PCT/US2019/039406, a counterpart application of U.S. Appl. No. 16/443,266, 11 pgs.

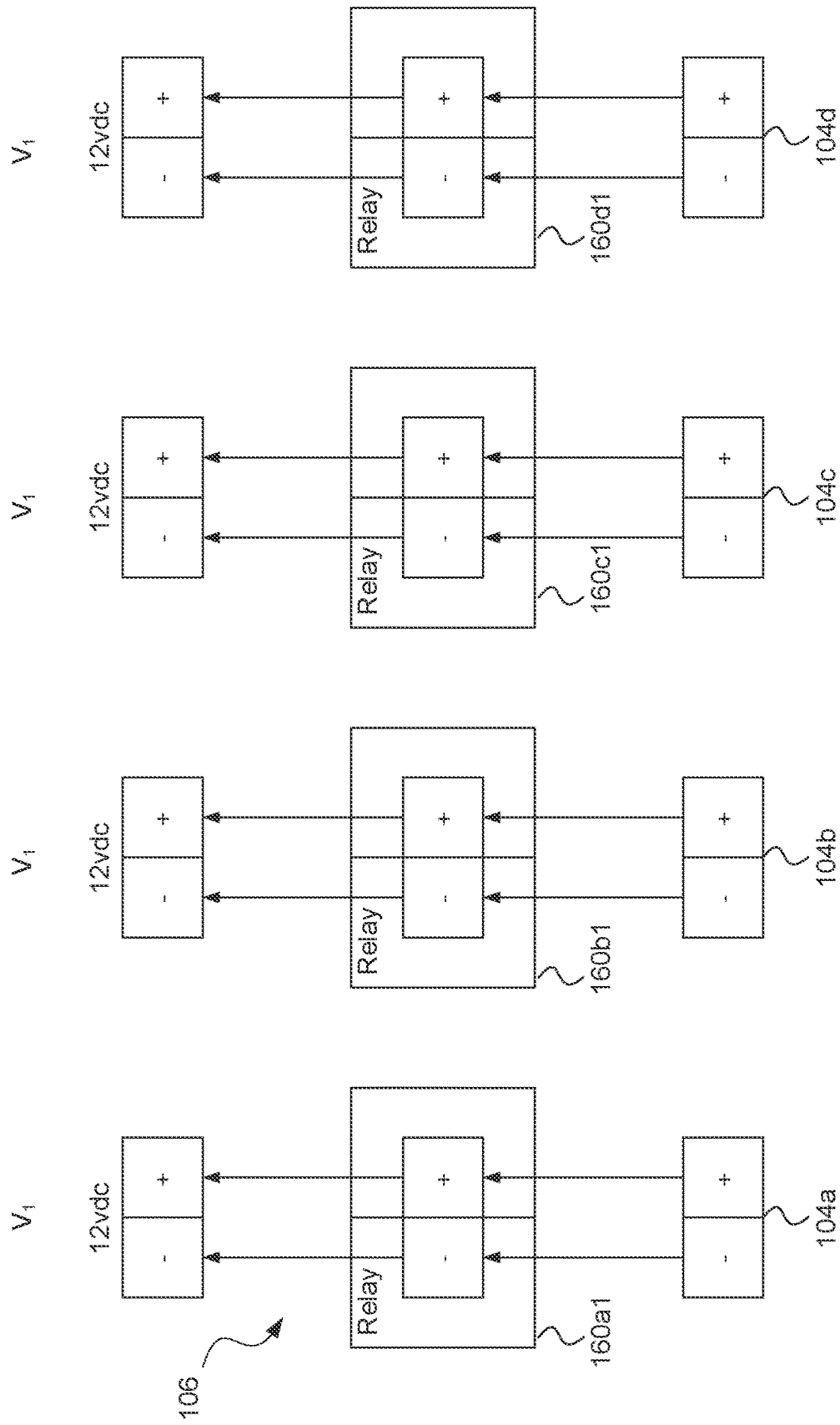

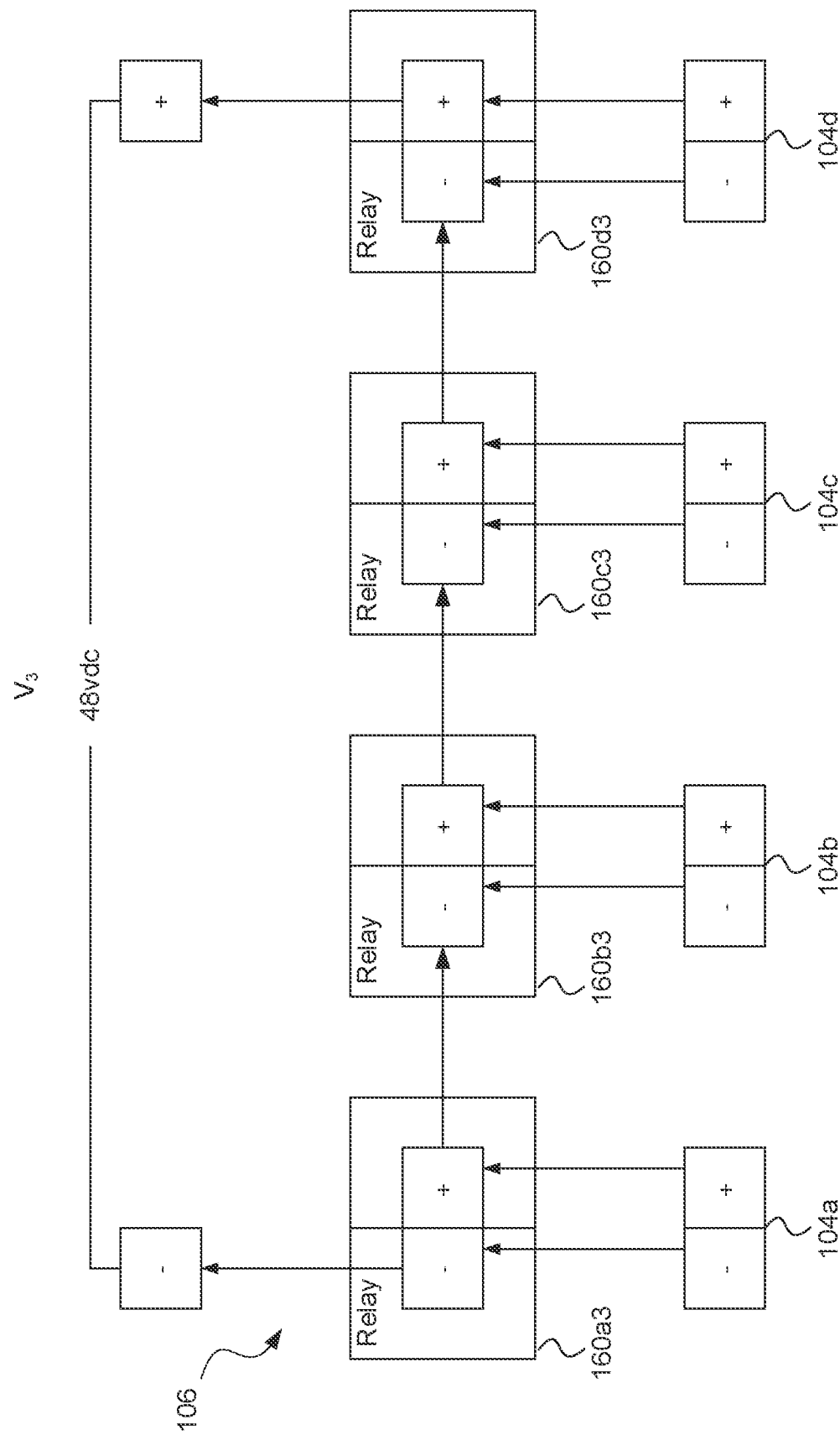

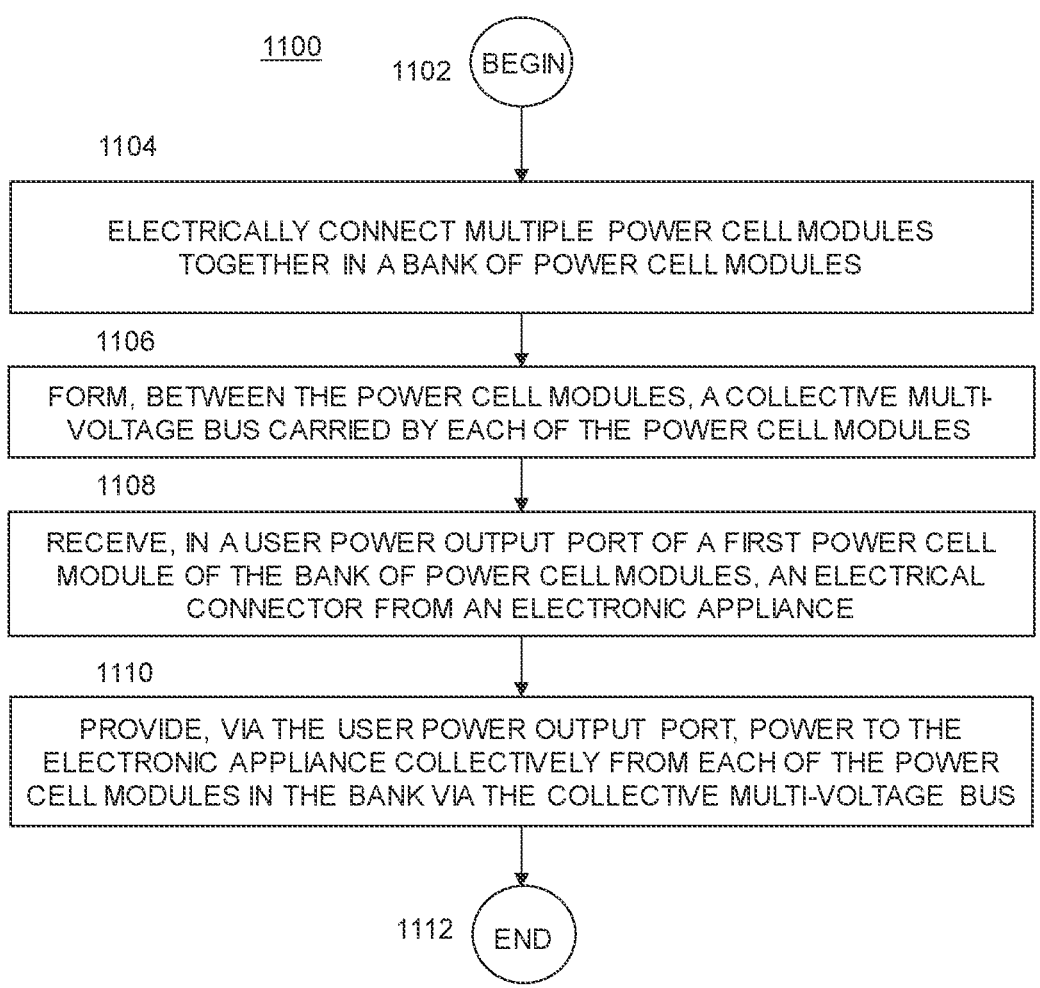

MODULAR BATTERY PACK SYSTEM WITH MULTI-VOLTAGE BUS

CROSS REFERENCE TO RELATED APPLICATIONS

This application is a continuation of U.S. patent application Ser. No. 17/357,680, filed Jun. 24, 2021, which is a continuation of U.S. patent application Ser. No. 16/706,057, filed Dec. 6, 2019; which is a continuation of U.S. patent application Ser. No. 16/443,266, filed Jun. 17, 2019; which claims the benefit of U.S. Provisional Patent Application No. 62/693,230, filed Jul. 2, 2018; the contents of each of which are incorporated herein by reference in their entirety.

BACKGROUND

Most households rely on the municipal power grid to supply their home energy needs. Municipal power grids typically utilize hydroelectric, nuclear, or fossil fuel power generation in order to supply a substantially constant and reliable source of electricity for homes, businesses, and public buildings.

In spite of the general reliability of municipal power grids, there are instances in which the municipal power grid is unable to supply electricity. For example, storms, earthquakes, accidents, maintenance, and equipment failure can all result in the interruption of the municipal power supply. In these situations, individuals and organizations may seek to implement backup or alternative power supply options.

Many individuals and organizations own combustion generators as a backup power supply or as a portable power supply solution. When the municipal power grid is interrupted, combustion generators can be used to generate electricity by burning fossil fuels. Individuals and organizations also use portable combustion generators to power electronic appliances at locations such as campsites, parks, and construction sites.

While combustion generators can be an effective solution in some instances, combustion generators also suffer from many drawbacks. For example, combustion generators are often very inefficient. When activated, they typically burn a fixed amount of fuel, regardless of the needs of the appliances that they are powering.

Furthermore, many appliances need to receive electrical power only intermittently. Combustion generators will continue to use fuel and generate electricity even during the periods when an electronic appliance does not need electricity. Although some generators have a low power mode, the low power mode still burns fuel continuously regardless of load. As an example, if a remote application requires 5 V, the combustion generator will maintain a minimum operating output that may greatly exceed the actual need, thereby wasting energy. Also, generators often have fixed amounts of fuel and therefore a fixed amount of time they can operate without receiving additional fuel.

Additionally, campsites and parks typically restrict the hours during which combustion generators can be operated. Other venues, such as trade shows or convention halls, may prohibit the use of generators entirely. Noise and fumes that are created often mean that combustion generators are placed at a distance, which creates power transmission problems.

While the municipal power grid is typically a reliable source of electricity for appliances, light fixtures, and other stationary electrical devices, the municipal power grid has serious limitations when it comes to providing electricity for devices that are not stationary. For example, electrical yard work tools such as leaf blowers, weed whackers, hedge trimmers require long extension cords if they are to receive power from the municipal power grid. This leads to serious drawbacks such as the high cost of sufficiently long extension cords and the hassle of extension cords become entangled and unplugged.

To deal with such drawbacks, manufacturers of power intensive portable electronic appliances have made battery-powered portable electronic devices. However, due to limited capacity, the batteries often drain before work is completed. The batteries must be recharged before the batteries can be utilized again. Additionally, charging these batteries requires specific cords and adapters that become lost or mixed among several cords and adapters.

What is needed is a system and method that solves the long-standing technical problem of providing alternative energy supply and storage solutions that are efficient, flexible, and simple in both stationary and portable situations.

SUMMARY

Embodiments of the preset disclosure provide a system of power cell modules that is effective in stationary and portable situations and that is effective for both large-scale and small-scale energy supply requirements. The power cell modules can be stacked together in a bank of power cells to jointly power electronic appliances. Individual power cell modules can be removed from the bank of power cells in order to provide power to portable electronic appliances, without interrupting the power provided by the bank of power cells to other electronic appliances.

In one embodiment, each individual power cell module provides multiple voltages to a multi-voltage bus. When the power cells are connected together in a bank or stack, the multi-voltage bus is connected across all of the power cells and receives the multiple voltages from each power cell. Each power cell includes user power outputs that carry the multiple available voltages and enable users to connect to any of the available voltages without operating any switches.

Accordingly, embodiments of the present disclosure provide a power source and energy supply solution that is robust enough to power a home, flexible enough to conveniently power portable equipment, and simple enough that users can easily implement the solution without risk and without involving a professional electrician.

In one embodiment, the system provides stackable, interchangeable, reconfigurable, independent, portable power and energy devices for the purposes of power generation, energy capture and storage solutions. The advantages of flexibility in the size, both physical and in feature and function, are numerous. System priorities can now become the primary driver in the decision process of stacking a system or choosing an individual module for the specific task. Some of the priorities that can be taken into account with such a system include but are not limited to physical strength of an individual user, available size and space at an intended destination, and need to capture/store energy at the location, the location itself For example, a vehicle may simply need assurance to power a dead starter battery. A relatively low output power cell module may be connected to run an application for a short period of time or may be used with multiple power cell modules to run for a longer duration. A power cell module or stack of power cell modules will provide energy to a device with intermittent power needs only when needed, unlike a combustion generator that will continue burning fuel to generate electricity regardless of the need.

In one embodiment, the power cell modules are safe and movable by a person. Regardless of the size of the total system, the power cell modules can be transported, stored, recharged, and used for the purposes of providing, storing or capturing energy.

In one embodiment, because the system can be made up of one or more power cell modules, the system is a better design, holistically, situationally, economically, sustainably, and with a more utilitarian approach than other designed systems. The system has the advantage of scaling up or down depending on the specific application.

Embodiments of the present disclosure address some of the shortcomings associated with traditional stationary and portable energy solutions. The various embodiments of the disclosure can be implemented to improve the technical fields of energy storage, off-grid energy solutions, emergency energy solutions, and portable power supplies.

BRIEF DESCRIPTION OF THE DRAWINGS

FIG. 10A is a block diagram of internal circuitry of a power cell module, in accordance with one embodiment.

FIG. 10C is a block diagram of internal circuitry of a power cell module, in accordance with one embodiment.

FIG. 11 is a flow diagram of a process for providing energy from a system of power cell modules, in accordance with one embodiment.

Figure 1:
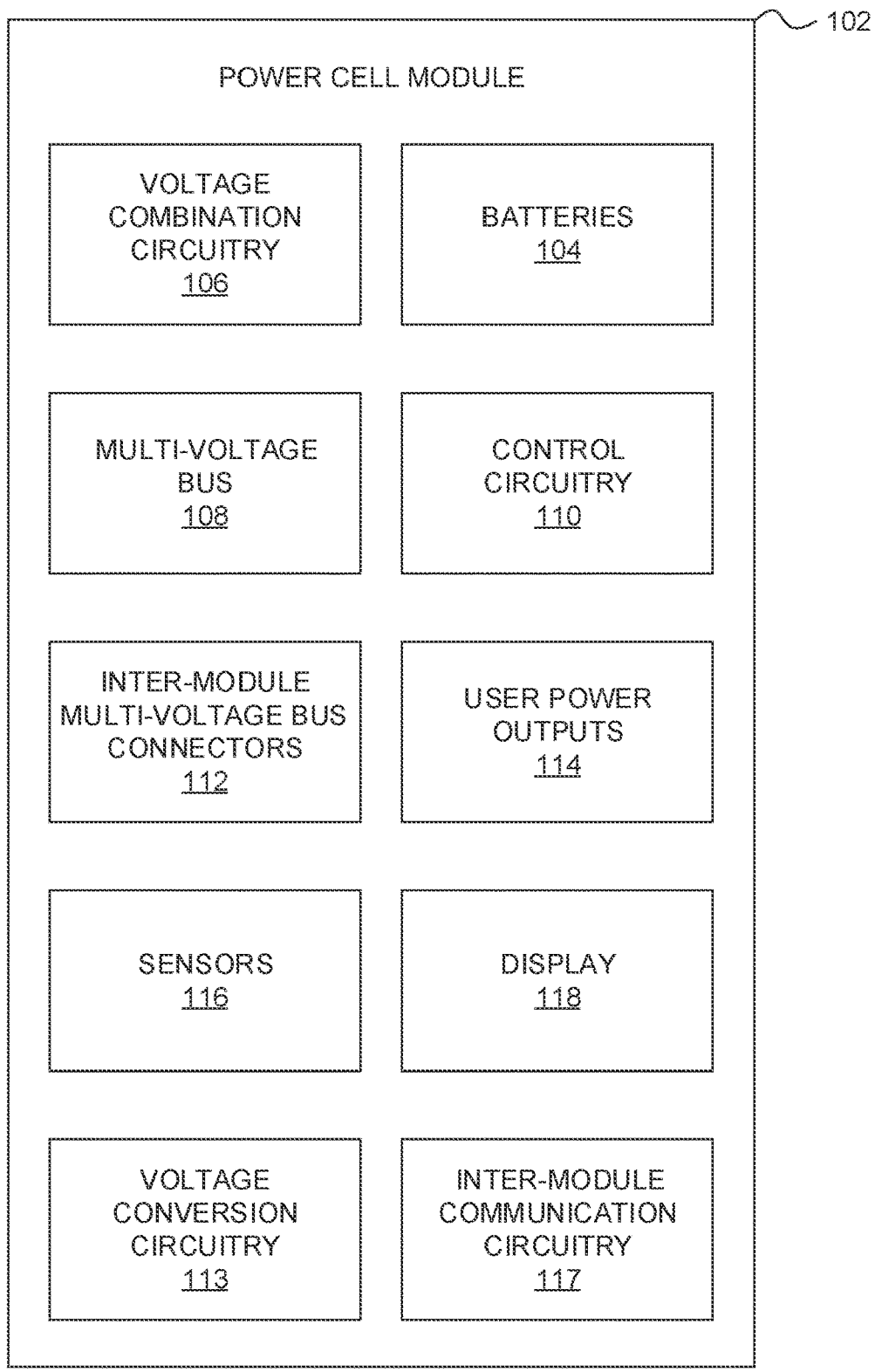
FIG. 1 is a block diagram of a power cell module, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

FIG. 1 is a block diagram of a power cell module 102, according to an embodiment The power cell module 102 includes a plurality of batteries 104, voltage combination circuitry 106, a multi-voltage bus 108, control circuitry 110, inter-module multi-voltage bus connectors 112, user power outputs 114, voltage conversion circuitry 113, inter-module communication circuitry 117, sensors 116, and a display 118, according to various embodiments. The components of the power cell module 102 enable the power cell module 102 to function as a standalone power supply or to connect with other power cell modules as part of a bank or stack of power cell modules that collectively provide electricity to one or more electronic appliances.

In one embodiment, the power cell module 102 includes a plurality of batteries 104. The batteries 104 can include one or more of lead acid batteries, lithium-ion batteries, Nickel-Zinc batteries, Nickel-Cadmium batteries, Nickel-metal-hydride batteries, and Zinc-Magnesium oxide batteries. In one embodiment, each of the batteries 104 within a given power cell module 102 is a same type of battery. Alternatively, in some embodiments, the batteries 104 in a given power cell module 102 can include multiple types of batteries.

In one example, in accordance with one embodiment, the power cell module 102 includes four individual batteries 104. The individual batteries 104 include 12 V lead acid batteries. The power cell module 102 utilizes the 12 V lead acid batteries to provide electricity to one more electronic appliances either as a standalone power cell module 102, or as part of a bank or stack of power cell modules 102 that collectively provide electricity to one or more electronic appliances.

In one embodiment, the power cell module 102 includes voltage combination circuitry 106. The voltage combination circuitry 106 is coupled to the terminals of the batteries 104 in order to provide, simultaneously, multiple output voltages from the batteries 104. The output voltages provided by the voltage combination circuitry 106 correspond to various series and parallel connections of the batteries 104. Thus, each output voltage provided by the voltage combination circuitry 106 corresponds to a parallel connection of multiple of the batteries 104, a series connection of multiple of the batteries 104, or a combination of series and parallel connections of multiple of the batteries 104.

In one embodiment, the voltage combination circuitry 106 provides the multiple output voltages simultaneously. For example, the voltage combination circuitry 106 can include one set of terminals that provide an output voltage that is a series connection of all the batteries 104, one set of terminals that provides an output voltage that is a parallel connection of all of the batteries 104, and a set of terminals that provides an output voltage that is a parallel connection of two sets of batteries wherein each set of batteries is a series connection of two or more of the batteries 104.

In one embodiment, the voltage combination circuitry 106 includes circuit components among the various connections that prohibit short-circuits among the various output voltages. For example, the connection between two terminals of two of the batteries 104 can include one or more diodes configured to prohibit the flow of current in an undesired direction. This can ensure that the voltage combination circuitry 106 can provide various combinations of voltages without short-circuiting and without the need of a multiplexer, according to one embodiment.

In one embodiment, the voltage combination circuitry 106 provides all the output voltages simultaneously. The voltage combination circuitry 106 does not generate the various output voltages via transformers, voltage multipliers, or charge pumps, according to an embodiment. Instead, the voltage combination circuitry 106 provides each output voltage as series, parallel, or series and parallel connections between the various terminals of the batteries 104, according to one embodiment.

In one embodiment, the power cell module 102 includes a multi-voltage bus 108. The multi-voltage bus 108 receives the output voltages from the voltage combination circuitry 106. The multi-voltage bus 108 includes a plurality of voltage lines, one for each output voltage of the multi-voltage bus 108. Thus, each voltage line of the multi-voltage bus 108 carries a voltage corresponding to one of the respective output voltages from the voltage combination circuitry 106. Accordingly, the multi-voltage bus 108 simultaneously carries all output voltages from the voltage combination circuitry 106, according to an embodiment.

In one embodiment, the multi-voltage bus 108 is designed so that when the power cell module 102 is connected in a bank of power cell modules, the multi-voltage bus 108 connects to a corresponding multi-voltage bus from all of the power cell modules of the bank of power cell modules. Accordingly, when the power cell module 102 is connected in a bank of power cell modules, the bank of power cell modules has a collective multi-voltage bus that is the continuation of each of the multi-voltage buses of the various power cell modules of the bank of power cell modules.

In one embodiment, when the power cell module 102 is connected to a second power cell module, each line of the multi-voltage bus 108 is electrically connected to a corresponding line of a multi-voltage bus of the second power cell module. If the multi-voltage bus 108 includes three lines each carrying either a respective output voltage V1, V2, or V3, when the power cell module 102 is connected to the second power cell module, the V1 line of the multi-voltage bus 108 is connected to the V1 line of the multi-voltage bus of the second power cell module, the V2 line of the multi-voltage bus 108 is connected to the V2 line of the multi-voltage bus of the second power cell module, and the V3 line of the multi-voltage bus 108 is connected to the V3 line of the multi-voltage bus of the second power cell module. Accordingly, the multi-voltage bus 108 of the modular battery power cell 102 and the multi-voltage bus of the second power cell module form a collective multi-voltage bus including the V1 line, the V2 line, and V3 line. Each additional power cell module connected into the bank of power cell modules joins the collective multi-voltage bus. Each power cell module provides V1, V2, and V3 to the collective multi-voltage bus.

In one embodiment, the advantage of the multi-voltage bus is that users do not need to manually control the power cell modules to provide a particular desired voltage. If this were not the case, then it is possible that each power cell module would need to be manually or electronically configured by the user in the exact same way to avoid short-circuits or other electrical problems that can come with mismatched voltage connections between the various power cell modules. Instead, each power cell module, in accordance with one embodiment, provides all voltages and contributes to the collective multi-voltage bus. As will be set forth in greater detail below, this enables a very simple set up that requires little or no electrical knowledge from users before they can safely and effectively use the power cell modules either individually or in a bank of power cell modules.

In one embodiment, the power cell module 102 includes control circuitry 110. The control circuitry 110 can include one or more processors or microcontrollers that control the operation of the power cell module 102. The one or more processors can execute software instructions stored in one or more memories in order to control the functionality of the various aspects of the power cell module 102. The one or more processors can also be controlled via manual interaction or wireless communication controlled inputs. The control circuitry 110 can operate in accordance with firmware stored in the one or more memories.

In one embodiment, the control circuitry 110 is able to selectively connect or disconnect the voltage combination circuitry 106 from the multi-voltage bus 108. For example, if the batteries 104 are depleted, or in a fault state, that the control circuitry 110 can operate switches are circuit breakers that disconnect the output voltages of the voltage combination circuitry 106 from the multi-voltage bus 108.

In one embodiment, the power cell module 102 includes sensors 116. The sensors 116 sense various aspects of the power cell module 102. The sensors 116 provides sensor signals to the control circuitry 110. The control circuitry 110 can control the components and functionalities of the power cell module 102 responsive to the sensor signals from the sensors 116 and in accordance with internal logic of the control circuitry 110. For example, the control circuitry 110 can disconnect the voltage combination circuitry 106 from the multi-voltage bus 108 responsive to the sensor signals.

In one embodiment, the sensors 116 can include multiple sensors that sense the voltages output by each battery 104. The voltage sensors can output sensor signals to the control circuitry 110 indicative of the voltage outputs of each battery. The voltage sensors can also sense the output voltages provided by the voltage combination circuitry 106 and can provide sensor signals to the control circuitry 110 indicative of the output voltages provided by the voltage combination circuitry 106. The control circuitry 110 can control components and functionality of the power cell module 102 responsive to the sensed voltages. In one embodiment, the voltage sensors are part of the control circuitry 110. Alternatively, the voltage sensors can be external to the control circuitry 110.

In one embodiment, the sensors 116 can include current sensors. The current sensors can sense the current flowing from each of the batteries 104. The current sensors can sense the total current flowing from the power cell module 102. The current sensors can also sense the current flowing from the batteries 104 through each line of the multi-voltage bus 108. The current sensors output sensor signals to the control circuitry 110 indicative of the various currents flowing in and from the power cell module 102. The control circuitry 110 can control components and functionality of the power cell module 102 responsive to the sensed currents. In one embodiment, the current sensors are part of the control circuitry 110. Alternatively, the current sensors can be external to the control circuitry 110.

In one embodiment, the sensors 116 can include temperature sensors. The temperature sensors can sense the temperatures of the batteries 104. The temperature sensors can sense a temperature within the power cell module 102. The temperature sensors can also sense the temperature of various components within the power cell module 102. The temperature sensors can output sensor signals indicative of the various temperatures to the control circuitry 110. The control circuitry 110 can then take action responsive to the temperatures. For example, the control circuitry 110 can disconnect the voltage combination circuitry 106 from the multi-voltage bus 108 to stop the flow of current in response to an indication that the batteries 104 overheating.

In one embodiment, the power cell module 102 includes user power outputs 114. The user power outputs 114 include various ports each outputting a particular voltage. For example, the user power outputs 114 can include one or more output ports for each voltage carried by the multi-voltage bus 108. A user can connect an electronic appliance to one of the output ports in order to provide power to the electronic appliance. The user can connect the electronic appliance to the output port that carries the correct voltage for the electronic appliance. The power cell module 102 can also include user power inputs that can receive electrical connections to provide power to the power cell module 102.

If the multi-voltage bus 108 includes three output voltages V1, V2, and V3, the user power outputs 114 can include multiple output ports for each output voltage. Each output port can correspondence to a particular type of connection. Accordingly, there may be multiple types of output ports for a single output voltage to fit multiple types of electrical connectors for electronic appliances. In one embodiment, the user power outputs 114 can receive dongles or adaptors that fit the output ports to particular common connection schemes. In one embodiment, if an electronic appliance requires a DC voltage other than those carried by the multi-voltage bus 108, then an adapter can be plugged into one of the output ports, receive the voltage from the output port, and step the voltage up or down in order to achieve the voltage required by the electronic appliance.

In one embodiment, when the power cell module 102 is connected in a bank of power cell modules, if a user plugs an electronic appliance into one of the user power outputs 114, power is provided to the electronic appliance from each power cell module connected to the multi-voltage bus 108. Thus, when an electronic appliance is plugged into the power output of one power cell module in a bank of power cell modules, the electronic appliance draws a portion of the overall current from each power cell module connected to the multi-voltage bus 108. Thus, large numbers of power cell modules can be connected in a bank so that a particular electronic appliance, or several electronic appliances, can be powered for a long time by the bank of power cell modules.

In one embodiment, the power cell module 102 includes voltage conversion circuitry 113. The voltage conversion circuitry 113 is connected to one or more of the voltage lines of the multi-voltage bus 108. The voltage conversion circuitry 113 receives one or more output voltages from the multi-voltage bus 108 and generates other voltages. The other voltages can include DC voltages intermediate to the output voltages of the multi-voltage bus 108, greater than the highest voltage carried by the multi-voltage bus 108, less than the smallest voltage carried by the multi-voltage bus 108, and voltages of a different type than the voltages carried by the multi-voltage bus 108. The user power outputs 114 can include one or more output ports for each voltage generated by the voltage conversion circuitry 113. This enables users to plug electronic appliances into output ports that carry voltages other than those carried by the multi-voltage bus 108.

In one embodiment, because the voltages generated by the voltage conversion circuitry 113 are generated from the multi-voltage bus 108, electronic appliances that receive voltages generated by the voltage conversion circuitry 113 draw power from each of the power cell modules connected to the multi-voltage bus 108.

In one embodiment, the voltage conversion circuitry 113 receives a DC voltage from the multi-voltage bus 108 and generates an AC voltage. The AC voltage is then provided to one or more of the user power outputs 114. Accordingly, the voltage conversion circuitry 113 can include one or more inverters to generate one or more AC voltages. In one embodiment, one of the AC voltages has an amplitude and frequency corresponding to the amplitude and frequency of a local municipal power grid. For example, one of the AC voltages can include 110 V AC at 60 Hz, corresponding to standard wall voltage in North America and many other areas. Another AC voltage can include 220 V AC at 60 Hz, corresponding to the increased voltage at which some electronic appliances operate in North America and many other areas.

In one embodiment, in the event of a failure of the municipal power grid, electronic appliances that normally plug into the wall voltage, or into the higher than wall voltage, can be plugged into the power cell module 102 or can otherwise receive power from the power cell module 102. If the power cell module 102 is connected in a bank of a large number of power cell modules, then the AC powered electronic appliances can draw power from all of the power cell modules that are connected to the multi-voltage bus 108. In one embodiment, the system can be plugged into a standard wall outlet of a house when the municipal power grid is interrupted and is not supplying power. A power chord can be plugged into the wall outlet from one of the power cell modules. The power cell module converts one of the DC output voltages from the multi-voltage bus into an AC voltage having the correct frequency and amplitude for the wall outlet. The AC voltage is then supplied to the wall outlet. All of the wall outlets that are on the same circuit can now be powered by the AC voltage supplied from the power cell module or bank of power cell modules. Before doing this, the user will need to access the circuit box and trip the circuit breaker to that circuit so that if the municipal power grid comes back online there will not be a short circuit. The power cell module can include protective circuitry to protect the power cell module in the event of a short circuit. The power can be supplied via a bank of power cell modules.

In one embodiment, the voltage conversion circuitry 113 can receive a voltage from the multi-voltage bus 108 and can convert the voltage to one or more voltages associated with typical personal electronic device connectors. For example, many electronic devices are powered by a specified small voltage, such as 3.1 V or 5 V. Many electronic devices are adapted to receive voltages from standardized output ports such as USB 2.0, USB 3.0, micro USB, USB C, or other types of charging ports. The voltage conversion circuitry 113 can generate the voltages associated with these types of charging ports. The user power outputs 114 can include multiple charging ports that fit the various standard ports and that receive the proper voltages from the voltage conversion circuitry 113. Users can then plug their personal electronic devices, such as mobile phones, tablets, ear phones, game controllers, wearable electronic devices, drones, and other kinds of personal electronic devices that can be charged from a standard output port, into the corresponding output ports of the user power outputs 114 in order to charge their personal electronic devices.

In one embodiment, the power cell module 102 includes a display 118. The display 118 can output data or other messages indicating a current state of the power cell module 102. The display 118 can indicate the number of power cell modules connected in a bank of power cell modules. The display 118 can indicate the current level of charge in the batteries 104, an indication of the current or power being output by the power cell module 102, or a length of time until the batteries 104 need to be recharged at the current power draw. The display 118 can indicate whether there is a fault condition associated with the power cell module 102. The display 118 can provide instructions to a user for initializing, utilizing, or troubleshooting the power cell module 102. The display 118 can provide data indicating which of the user power outputs 114 is currently in use. The display 118 can provide information such as the temperature within the power cell module 102 or the voltage levels of the batteries 104.

In one embodiment, the control circuitry 110 can control the display 118. The control circuitry 110 can output messages to the user via the display 118. The control circuitry 110 can output instructions to the user for operating the power cell module 102 or for providing the current status of the power cell module 102 to the user. The display can also display information pushed to other power cell modules or connected electronic devices.

In one embodiment, the power cell module 102 includes inter-module multi-voltage bus connectors 112. The inter-module multi-voltage bus connectors 112 electrically connect the voltage lines of the multi-voltage bus 108 to the corresponding voltage lines of a second power cell module. The inter-module multi-voltage bus connectors 112 can include Anderson connectors or other types of standard or unique connectors that can couple the voltage lines of the multi-voltage bus 108 to the corresponding voltage lines of the multi-voltage bus of a second power cell module.

In one embodiment, the inter-module multi-voltage bus connectors 112 automatically connect the voltage lines of the multi-voltage bus 108 to the corresponding voltage lines of a second power cell module when the power cell module 102 is attached to the second power cell module. Accordingly, the inter-module multi-voltage bus connectors 112 can include fasteners that assist in securely fastening the power cell module 102 to a second power cell module when stacked together.

In one embodiment, the power cell module 102 includes inter-module multi-voltage bus connectors 112 on top and bottom surfaces of the power cell module 102. Thus, when the power cell module 102 is connected in a bank of power cell modules 102, the power cell module 102 can be connected to a second power cell module below the power cell module 102, and a third power cell module can be connected to the top of the power cell module 102. In one embodiment, the power cell module 102 can include latches, releases, and other connection hardware that enables the power cell module 102 to quickly attach to other power cell modules and to quickly be released from other power cell modules.

In one embodiment, the power cell module 102 includes inter-module communication circuitry 117. The inter-module communication circuitry 117 enables the power cell module 102 to communicate with other power cell modules in a bank of power cell modules in which the power cell module 102 is connected. The inter-module communication circuitry 117 can share the status or condition of each power cell module. In one embodiment, the inter-module communication circuitry 117 includes wireless transceivers enabling the power cell modules to communicate with each other wirelessly. In one embodiment, the inter-module communication circuitry 117 includes wired connections that enable the power cell modules to communicate with each other across wired connections. In one embodiment, the inter-module communication circuitry can enable the power cell module 102 to establish which power cell module in a bank of connected power cell modules is the master or controlling power cell module.

In one embodiment, the inter-module communication circuitry can communicate with one or more users. For example, the inter-module communication circuitry 117 can send alerts to the user regarding the current state of the inter-power cell module 102, or the bank of inter-power cell modules. The inter-module communication circuitry 117 can alert the user when the overall capacity of the bank of power cell modules is low so that the user can recharge power cell modules or make other provisions for powering electronic appliances. In one embodiment, the users can install a dedicated power cell module system application on a personal computing device, such as a smart phone. The power cell module system application can enable the user to control or otherwise communicate with the power cell modules.

In one embodiment, when the power cell modules are connected in a bank of power cell modules, one of the power cell modules can be designated as the master power cell module. Users can be directed to connect electronic appliances to the master power cell module, the electronic appliances can then be powered by the entire bank of power cells via the master power cell. In one embodiment, the master power cell is substantially the same as the other power cell modules in the bank power cells. Alternatively, the master power cells can be a different type of power cell that includes additional connections and functionality.

In one embodiment, the power cell module I02 includes a casing. The components of the power cell module one I02 are positioned primarily within the casing. The display 118 and the user power outputs 114 can be positioned on an outer surface of the casing. The inter-module multi-voltage bus connectors 112 can also be positioned, at least partially, and an outer surface of the casing. Inter-module data connection ports and other 1/0 ports can be positioned on the outer surface of the casing.

Those of skill in the art will recognize, in light of the present disclosure, that a power cell module I02 in accordance with the present disclosure can include additional components, fewer components, or different combinations of components than are shown in FIG. 1, without departing from the scope of the present disclosure.

Figure 2:
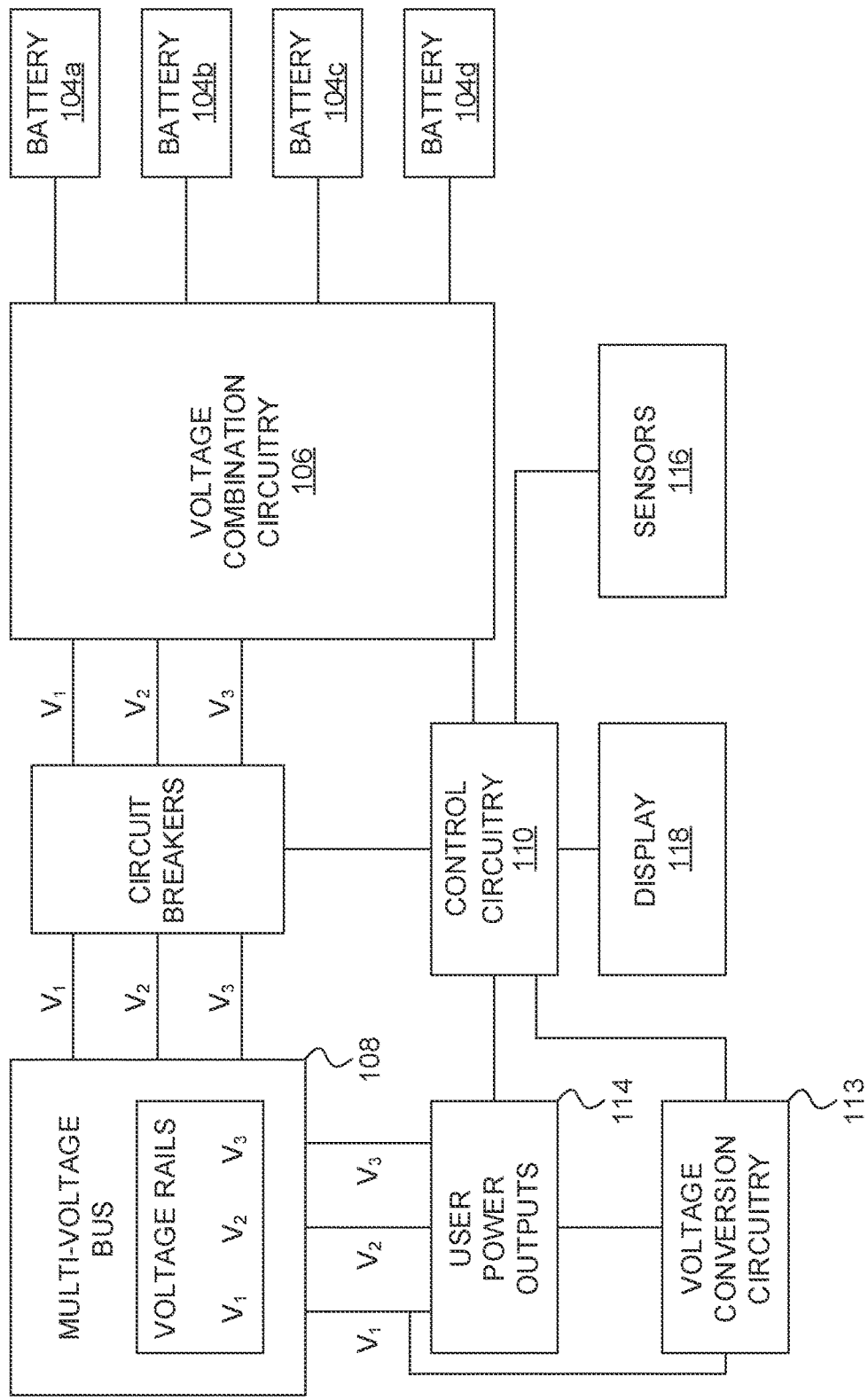
FIG. 2 is a block diagram of internal circuitry of a power cell module, in accordance with one embodiment.

FIG. 2 is a block diagram of circuitry of the power cell module 102 of FIG. 1, according to one embodiment. With reference to FIGS. 1-2 and the description of FIG. 1 above, the power cell module I02 includes four batteries I04a-104d, voltage combination circuitry I06, circuit breakers 119, a multi-voltage bus 108, voltage conversion circuitry 113, user power outputs 114, control circuitry 110, sensors 116, and a display 118, according to various embodiments.

In one embodiment, the four batteries 104a-104d are connected to the voltage combination circuitry 106. In particular, both the positive and negative terminal of each battery are connected to the voltage combination circuitry 106.

In one embodiment, the voltage combination circuitry 106 receives the voltages from the batteries I04a-104d and generates voltage output voltages VI-V3. In one embodiment, each of the output voltages V1-V3 corresponds to a series connection of the batteries 104a-104d, a parallel connection of the batteries I04a-104d, or a combination of series and parallel connections of the batteries 104a-104d. While the example of FIG. 2 illustrates three output voltages V1-V3, the voltage combination circuitry 106 can provide more or fewer output voltages than three, according to various embodiments.

In one embodiment, the voltage combination circuitry 106 provides the output voltages V1-V3 to the multi-voltage bus 108. In particular, the voltage combination circuitry 106 provides all three output voltages V1-V3 to the multi-voltage bus 108 simultaneously.

In one embodiment, circuit breakers 119 are positioned between the voltage combination circuitry 106 and the multi-voltage bus 108. The circuit breakers 119 can break the connection between the voltage combination circuitry 106 and the multi-voltage bus 108 such that the multi-voltage bus 108 does not receive the output voltages V1-V3 from the voltage combination circuitry 106.

In one embodiment, the control circuitry 110 controls the circuit breakers 119. The control circuitry 110 can selectively cause the circuit breakers 119 to break the circuit between the voltage combination circuitry 106 and the multi-voltage bus 108. The control circuitry 110 can control the circuit breakers 119 responsive to conditions within the power cell module 102. For example, the control circuitry 110 can receive the sensor signals from the sensors 116. If the sensor signals indicate a fault condition within the power cell module 119, then the control circuitry 110 can cause the circuit breakers 119 to break the circuit. Additionally, if the sensor signals indicate that the voltage of one or more of the batteries 104a-104d is too low to supply power to the multi-voltage bus 108, then the control circuitry 110 can cause the circuit breakers 119 to break the circuit. In one embodiment, the circuit breakers 119 include switches that can be operated by the control circuitry 110 to selectively disconnect or connect the voltage combination circuitry 106 to the multi-voltage bus 108.

In one embodiment, the multi-voltage bus 108 includes voltage lines 121. Each voltage line carries a respective output voltage provided by the voltage combination circuitry 106. Accordingly, the multi-voltage bus 108 simultaneously carries all of the output voltages provided by the voltage combination circuitry 106. As set forth above, when the power cell module 102 is connected in a bank of power cell modules, the multi-voltage bus 108 and the voltage lines 121 are part of a collective multi-voltage bus in which all connected power cell modules provide the output voltages V1-V3 to the collective multi-voltage bus. An electronic appliance connected to one of the power cell modules in the bank receives power from each power cell module that is connected to the collective multi-voltage bus.

In one embodiment, the user power outputs 114 include, for each output voltage V1-V3, one or more output ports that carry the respective output voltage and enable an electronic appliance to be connected to receive that output voltage.

In one embodiment, the voltage conversion circuitry 113 receives one or more of the output voltages V1-V3 and generates converted voltages from the output voltages V1-V3. The converted voltages can include AC voltages, DC voltages intermediate to the output voltages V1-V3, DC voltages greater than any of the output voltages V1-V3, and DC voltages less than any of the output voltages V1-V3. The voltage conversion circuitry 113 provides these converted voltages to the user power outputs 114. The user power outputs 114 include, for each converted voltage, one or more output ports to which an electronic appliance can be connected to receive that voltage.

In one embodiment, the control circuitry 110 is connected to the voltage combination circuitry 106, circuit breakers 119, the user power outputs 114, the voltage conversion circuitry 113, the display 118, and the sensors 116, according to various embodiments. The control circuitry 110 can control aspects of the functionality of these components, according to various embodiments.

Figure 3:
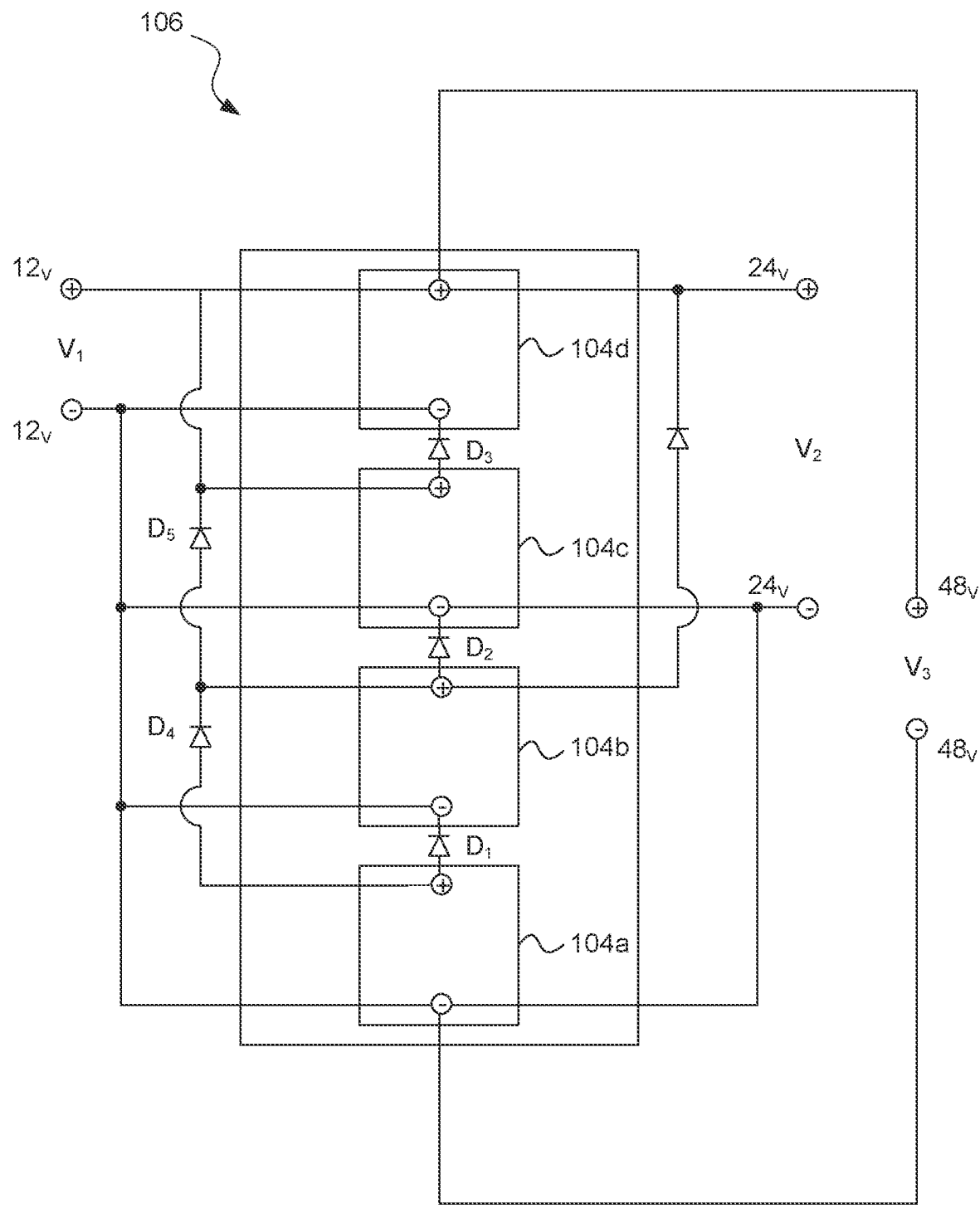
FIG. 3 is a schematic diagram of voltage combination circuitry of a power cell module, according to one embodiment.

FIG. 3 is a schematic diagram of the batteries 104a-104d and the voltage combination circuitry 106 of FIGS. 1-2, according to an embodiment. With reference to FIGS. 1-3, and the descriptions of FIGS. 1-2 above, FIG. 3 illustrates four batteries 104a-104d. Each of the batteries 104a-104d includes a positive and the negative terminal with 12 V between the positive and the negative terminal.

In one embodiment, the voltage combination circuitry 106 includes wired connections to each of the terminals of the batteries 104a-104d. The voltage combination circuitry 106 includes diodes D1-D6 connected between various terminals of the batteries 104a-104d. The voltage combination circuitry 106 provides output voltages V1-V3.

In one embodiment, the output voltage VI is 12 V. The output voltage VI corresponds to each of the batteries 104a-104d connected in parallel. Because each battery provides 12 V, the parallel connection of all the batteries 104a-104d provides 12 V. The negative terminal of VI is connected to the negative terminal of each of the batteries 104a-104d. The positive terminal of VI is connected to the positive terminal of each of the batteries 104a-104d.

In one embodiment, the output voltage V2 is 24 V. The output voltage V2 corresponds to the series connection of batteries 104a and 104b connected in parallel with the series connection of batteries 104c, 104d, resulting in a total voltage of 24 V. The positive terminal of V2 is connected to the positive terminals of the batteries 104b and 104d. The negative terminal of V2 is connected to the negative terminals of the batteries 104a and 104c.

In one embodiment, the output voltage V3 is 48 V. The output voltage V3 corresponds to the series connection of all four batteries 104a-104d, resulting in a total voltage of 48 V. The positive terminal of V3 is connected to the positive terminal of the battery 104d. The negative terminal of V3 is connected to the negative terminal of the battery 104a.

In one embodiment, the diode DI is connected between the positive terminal of the battery 104a and the negative terminal of the battery 104b. The diode D2 is connected between the positive terminal of battery 104b and the negative terminal a battery 104c. The diode the three is connected between the positive terminal of the battery 104c and the negative terminal of the battery 104d. The diode D4 is connected between the positive terminal of the battery 104 a and the positive terminal of the battery 104b. The diode D5 is connected between the positive terminal of the battery 104b and the negative terminal of the battery 104c. The diode D6 is connected between the positive terminal of the battery 104b and the positive terminal of the battery 104d. The connection of the diodes D1-D6 ensure that the voltage combination circuitry 106 can safely output all three output voltages V1-V3 without short-circuits. Those of skill in the art will recognize, in light of the present disclosure, that other circuit schematics can be implemented to provide the multiple output voltages while preventing short-circuits, without departing from the scope of the present disclosure.

In one embodiment, the diodes D1-D6 include Schottky diodes. In one embodiment, the diodes D1-D6 includes 102a-102c ener diodes with a high enough Zener voltage to withstand the highest DC voltages that could be applied as a reverse bias within the power cell module 102. In one embodiment, the diodes D1-D6 include p-n diodes.

Figure 4:
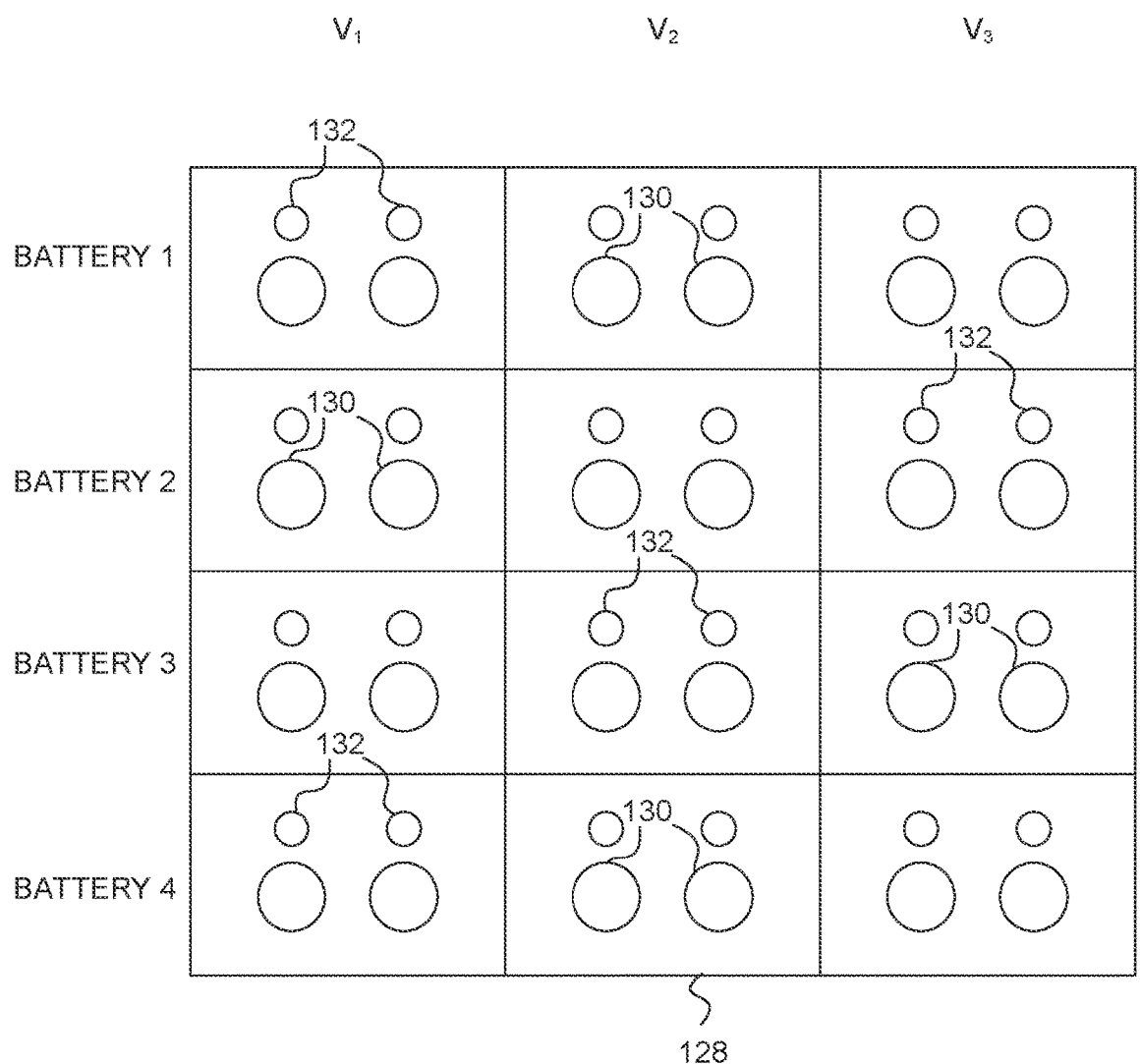
FIG. 4 is an illustration of a wiring harness for a power cell module, in accordance with one embodiment.

FIG. 4 is a block diagram of a wiring harness 128, according to one embodiment. With reference to FIGS. 1-4 and the descriptions of FIGS. 1-3 above, the wiring harness 128 is part of the voltage combination circuitry 106. The wiring harness 128 facilitates the connections by which the output voltages V1-V3 are generated.

In one embodiment, each of the batteries 104a-104d takes part in generating each of the output voltages V1-V3. The wiring board includes, for each combination of battery and output voltage, a pair of wiring slots 130 and a pair of screw slots 132. In each pair of wiring slots 130, one wiring slot is connected to the positive terminal of the corresponding battery and the other slot is connected to the negative terminal of the corresponding battery. The screw holes 132 are each configured to receive a screw. When a wire is placed in the wiring slot 130 below a screw hole 132, and a screw is screwed into the screw hole 132, the wire is forced into electrical contact with the corresponding battery terminal.

In one embodiment, wires are placed in each wiring slot 130 and screws are fastened into each of the corresponding screw holes 132. The wires can then be connected in the series and parallel connections to generate the output voltages V1-V3. The wires plugged into the screw holes 130 in the column V1 are used to generate the output voltage V1. The wires plugged into the screw holes 130 in the column V2 are used to generate the output voltage V2. The wires plugged into the screw holes in the column V3 are used to generate the output voltage V3.

Figure 5:
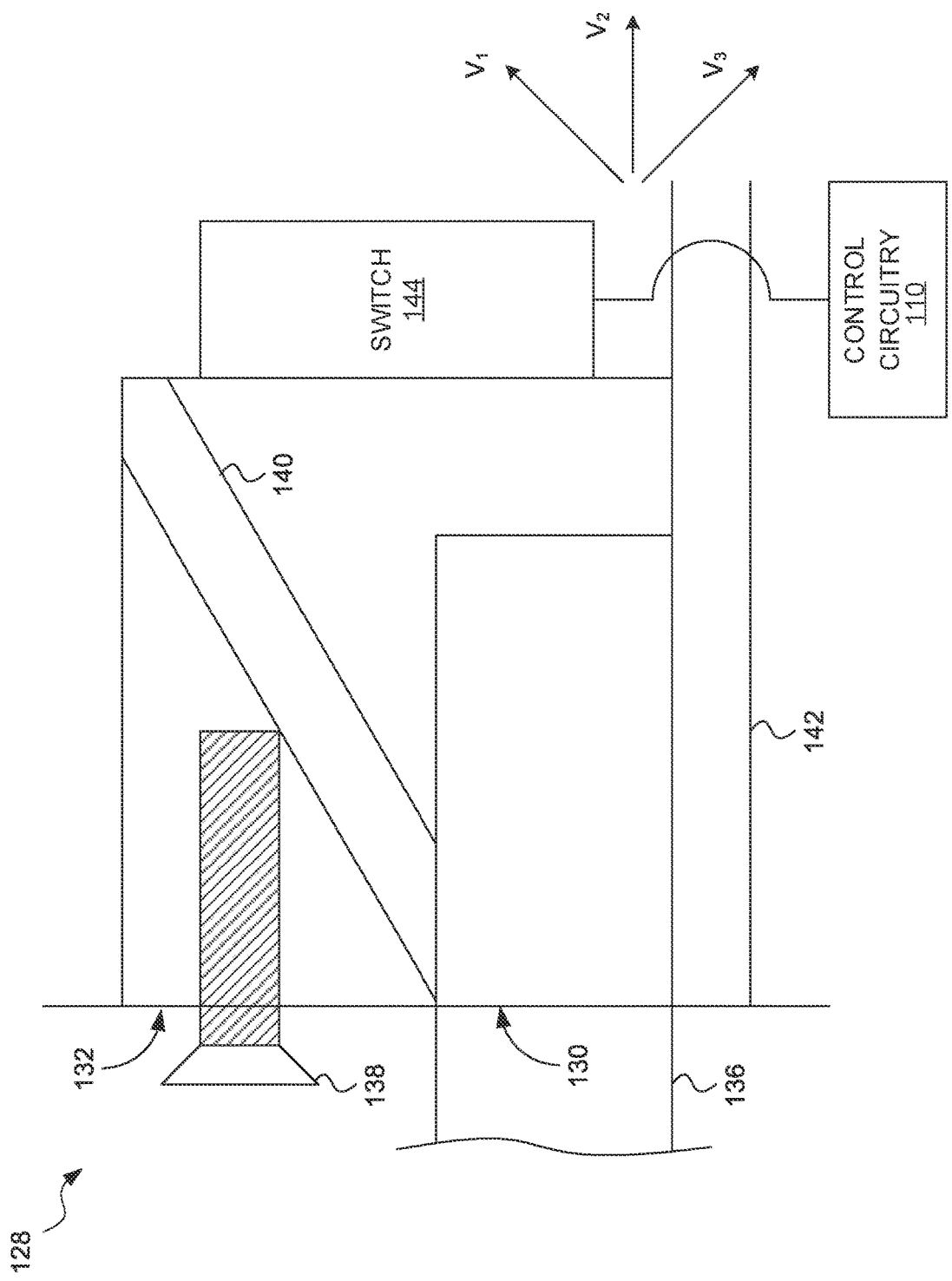
FIG. 5 is side sectional view of a portion of a wiring harness for a power cell module, in accordance with one embodiment.

FIG. 5 is a side view of a portion of the wiring harness 128 of FIG. 4, according to an embodiment. With reference to FIGS. 1-5 and the descriptions of FIGS. 1-4 above, a wire 136 is positioned in the wiring slot 130. An exposed end of the wire 136 is in contact with a busbar 142. The busbar 142 is electrically connected to one of the terminals of one of the batteries. A screw 138 is screwed into the screw hole 132. The end of the screw 138 contacts a contact member 140. As the screw 138 is screwed further into the screw hole and 32, the end of the screw 138 forces the contact member 142 pressed downward on the wire 136. The downward pressure on the wire 136 forces the wire 136 into stable electrical contact with the busbar 142.

In one embodiment, the control circuitry 110 can force the voltage combination circuitry to generate only one of the output voltages V1-V3. In this case, the control circuitry 110 controls one or more switches 144 that decouple the busbars 142 for the deselected output voltages from the terminals of the batteries. The result is that only the busbars 142 associated with the selected output voltage will be electrically connected to the terminals of the batteries, thereby ensuring that only the selected output voltage will be generated by the voltage combination circuitry 106.

Figure 6:
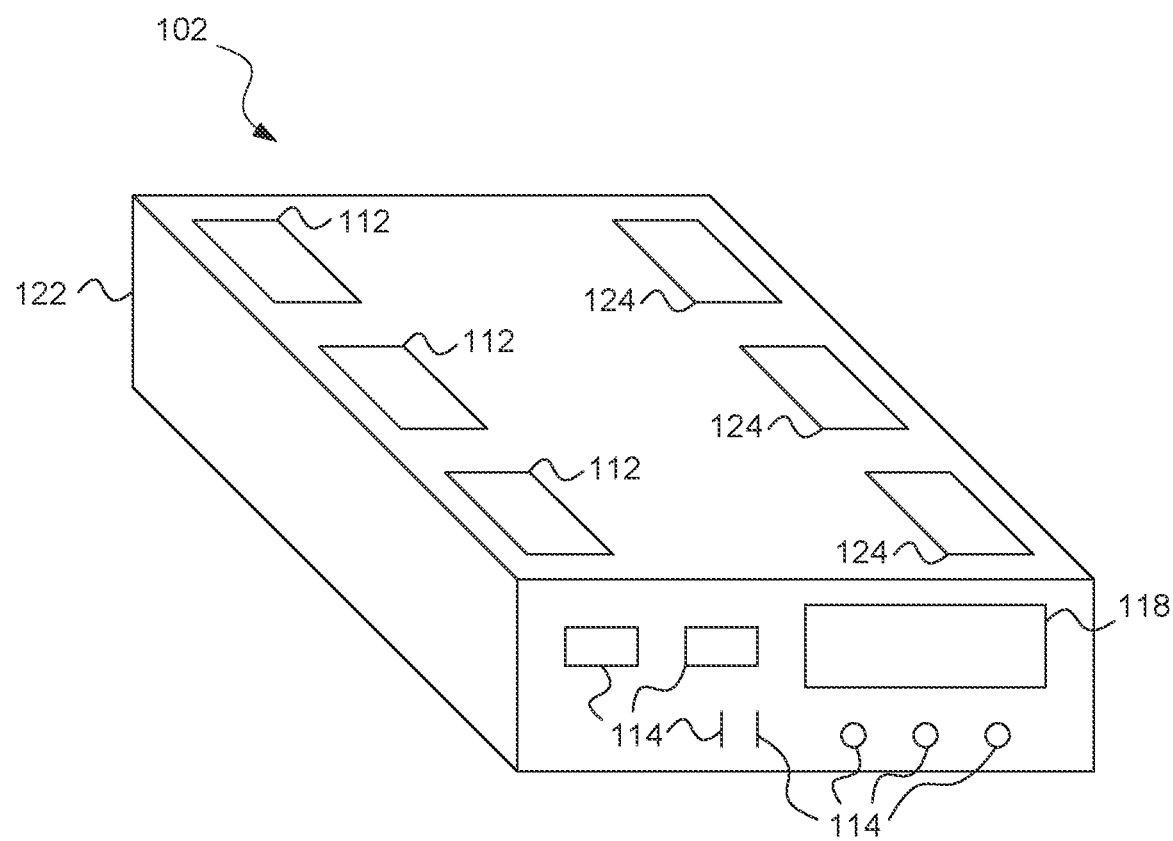
FIG. 6 is an illustration of a power cell module, in accordance with one embodiment.

FIG. 6 is an illustration of a power cell module 102, according to an embodiment. With reference to FIGS. 1-6 and the descriptions of FIGS. 1-5 above, the power cell module 102 includes a casing 122. The casing 122 houses the batteries 104a-104d, the voltage combination circuitry 106, the control circuitry 110, the sensors 116, the multi-voltage bus 108, and other internal components of the power cell module 102.

In one embodiment, the casing 122 is formed of a durable material that can withstand the weight of several power cell module stacked on top of it. The material of the casing is also selected to withstand portable use of the power cell module 102. The casing 122 can include a hard and durable plastic, according to an embodiment.

In one embodiment, the inter-module multi-voltage bus connectors 112 are positioned on the top surface of the power cell module 102. Though not shown in FIG. 6, inter-module multi-voltage bus connectors 112 are also positioned on a bottom surface of the power cell module 102.

In one embodiment, when a power cell module is stacked on top of the power cell module 102, the inter-module multi-voltage bus connectors 112 on the top surface of the power cell module 102 connect with inter-module multi-voltage bus connectors on a bottom surface of the other power cell module. The inter-module multi-voltage bus connectors 112 ensure a secure electrical connection of the voltage lines of the output voltages of the multi-voltage bus 108 of each of the power cell modules, forming a collective multi-voltage bus from all of the power cell modules in a stack. Additionally, though not shown, inter-module multi-voltage bus connectors 112 can also be positioned on lateral surfaces of the power cell module 102 to facilitate stacking or connecting power cell modules laterally as well as vertically.

In one embodiment, the inter-module multi-voltage bus connectors 112 can include Anderson connectors. Additionally, or alternatively, the inter-module multi-voltage bus connectors 112 can include other types of electrical connectors. Each inter-module multi-voltage bus connector 112 can include a positive and a negative terminal for the corresponding output voltage. In one embodiment, the inter-module multi-voltage bus connectors 112 can also include fasteners that securely fasten power cell module 102 to the power cell module that is placed on top of the power cell module 102, or on top of which the power cell module 102 is placed, as the case may be.

In one embodiment, the power cell module 102 also includes fasteners 124 on the top and bottom surfaces of the power cell module 102. The fasteners 124 can assist in fastening the power cell module 102 to a power cell module placed on top of the power cell module 102 the fasteners 124 can assist in fastening the power cell module to a power cell module placed on the bottom of the power cell module 102.

In one embodiment, the power cell module 102 also includes user power outputs 114 on a front face of the power cell module 102. User power outputs 114 can also be positioned on other faces of the power cell module 102. Users can connect electronic appliances to the user power outputs 114 in order to power electronic appliances with the power cell module 102, or with a stack of power cell modules.

In one embodiment, the power cell module 102 can also include user input devices, not shown in FIG. 6. The user input devices can enable the user to input commands or otherwise control features of the power cell module 102. The user input devices can include buttons, switches, sliders, knobs, keypads, touchscreens, or other devices by which users can input commands or control features of the power cell module 102. In one embodiment, the user input devices include a power button that enables the user to turn the power cell module 102 on or off.

In one embodiment, the power cell module can also include data ports, not shown in FIG. 6. The data ports can include connectors for reading data from or writing data to a memory within the power cell module 102.

In one embodiment, the power cell module 102 includes a display 118. The display 118 can display text, images, or animations. The user can read or view the text, images, or animations displayed by the display 118.

Those of skill in the art will recognize, in light of the present disclosure, that the power cell module in accordance with principles of the present disclosure can have other shapes and configurations than that which is shown in FIG. 6, without departing from the scope of the present disclosure.

Figure 7:
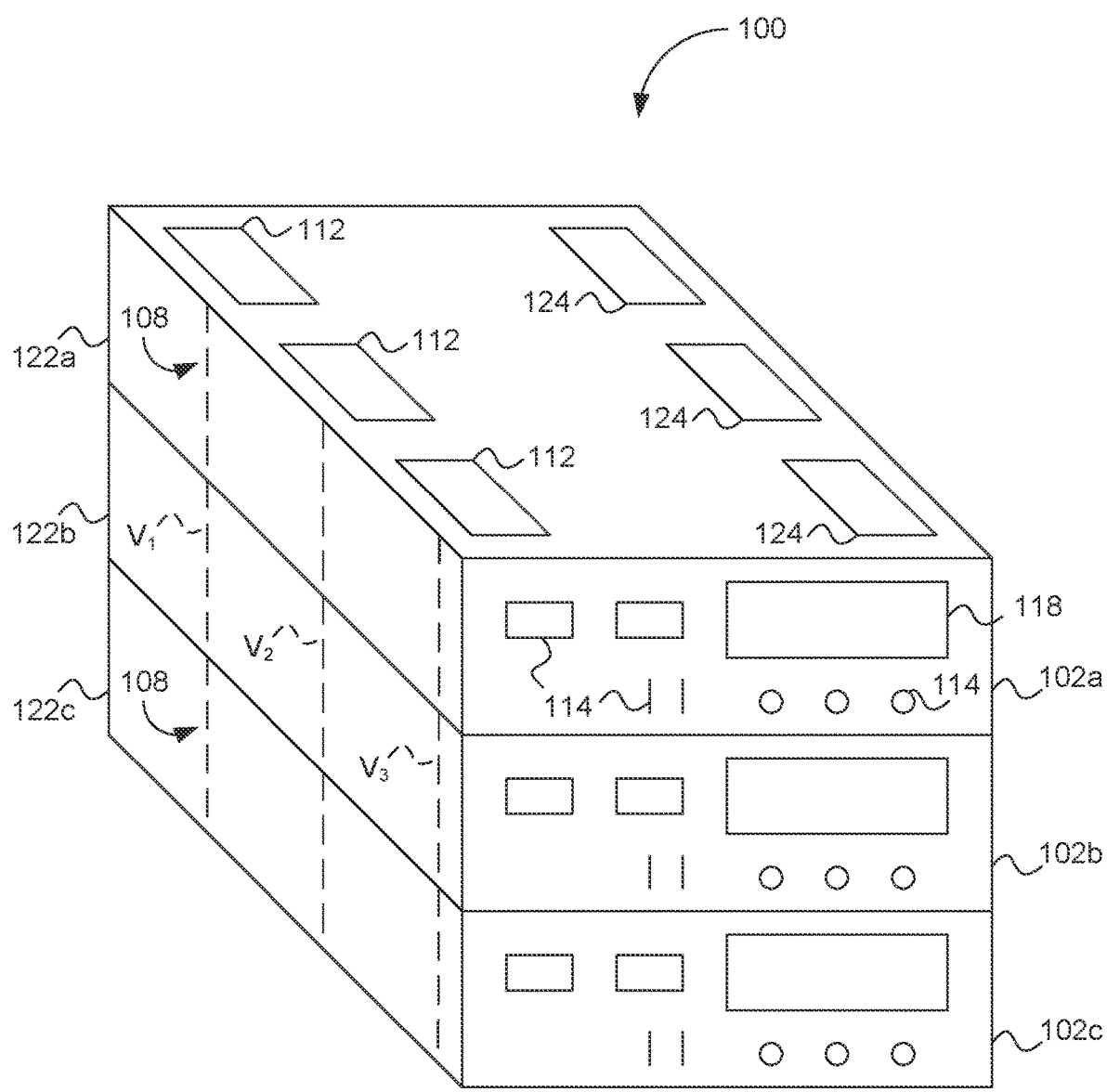
FIG. 7 is an illustration of a system including a bank of power cell modules, in accordance with one embodiment.

FIG. 7 illustrates a energy storage and supply system 100 including a bank of power cell modules 102*a*-102*c*, according to one embodiment. With reference to FIGS. 1-7 and the descriptions of FIGS. 1-6 above, FIG. 7 illustrates three power cell modules 102*a*-102*c*. However, more or fewer power cell modules can be connected in a bank of power cell modules in accordance with principles of the present disclosure.

In one embodiment, each power cell module the bank of power cell modules is connected in such a manner that a collective multi-voltage bus 108 is formed. The collective multi-voltage bus 108 includes a voltage line for each output voltage V1-V3. The collective multi-voltage bus 108 simultaneously carries each of the output voltages V1-V3.

In one embodiment, when an electronic appliance is connected to one of the user power outputs 114 of one of the power cell modules 102*a*-102*c*, power is provided to the electronic appliance from each of the power cell modules 102*a*-102*c*. The voltage lines of the multi-voltage bus 108 are shown as dashed lines internal to the casings 122*a*-122*c* of the power cell modules 102*a*-102*c*. While each output voltage is shown as having a single line, in practice, each output voltage has both a positive and a negative line defining the output voltage.

In one embodiment, each power cell in the system 100 is substantially identical, having the same user power outputs 114, the same display 118, and possibly other identical features such as user inputs and data ports. In this case, power can be supplied by plugging an electronic appliance into the user power outputs 114 of any of the connected power cell modules 102*a*-102*c*. Alternatively, one of the power cell modules can act as a master to the other power cell modules in the stack. In this case, the electronic appliances are connected to the user power outputs 114 of the master power cell module. The master power cell module can be the top power cell module, as one example, or the bottom power cell module, as another example.

In one embodiment, the power cell modules 102*a*-102*c* are not identical to each other. Instead, some power cell modules may have more or fewer features, different arrangements of components, different numbers of components, different sizes, different power storage and supply capacities, or other types of differences. In this case, the inter-module multi-voltage bus connectors 112 still ensure that each power cell module 102*a*-102*c* joins the multi-voltage bus 108. In one embodiment, one of the multi-voltage power cells is a controlling or master multi-voltage power cell having additional features compared to the other power cell modules in the stack. Some power cell modules in the stack may be relatively featureless in that they do not have user power outputs 114 and are only used to connected into the stack to provide additional energy capacity to the system 100. Thus, the stack may include one or master or controlling power cell modules, and one or more simple or slave power cell modules that serve only to provide additional capacity the system 100, according to one embodiment.

Figure 8:
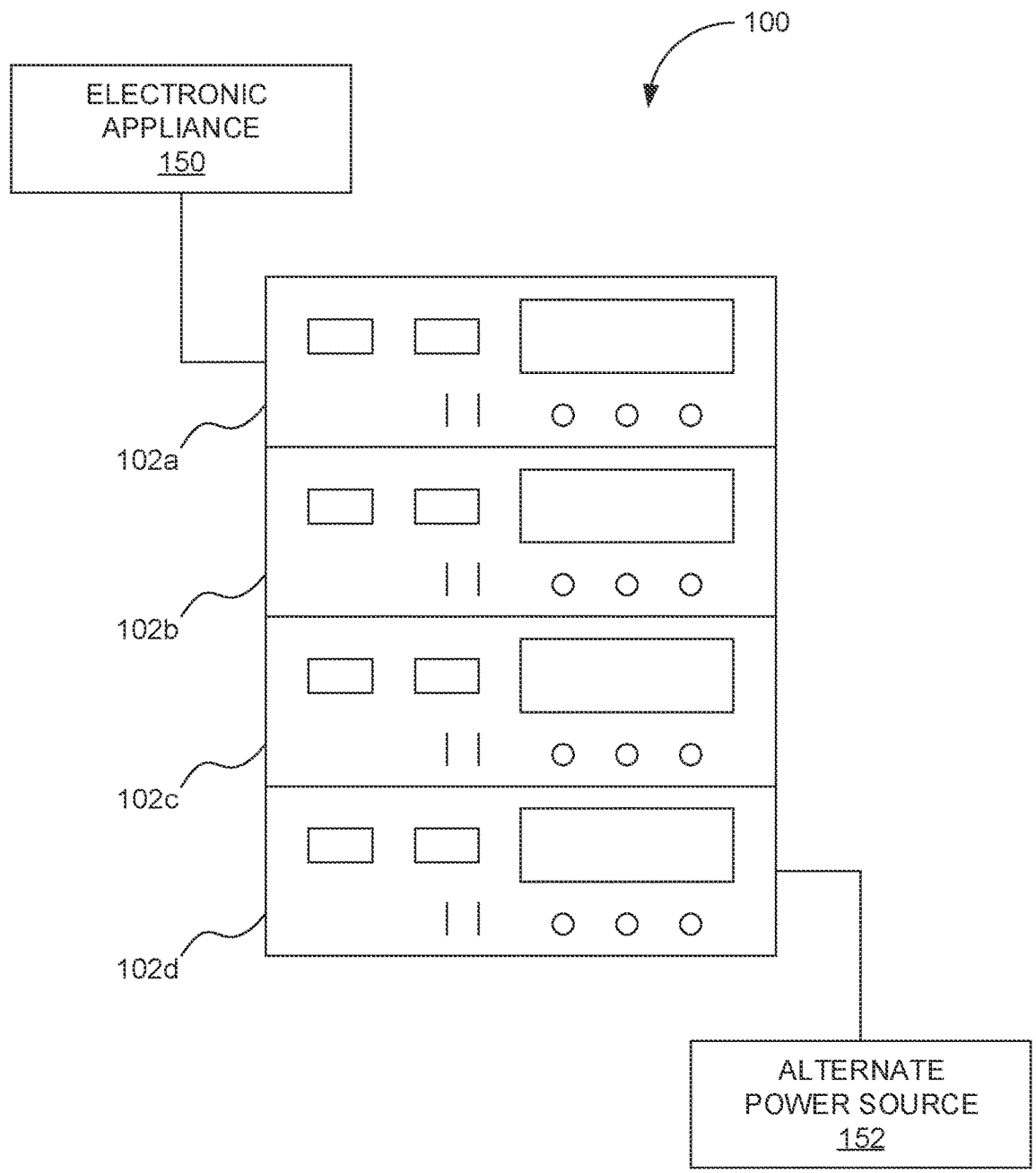
FIG. 8 is an illustration of an energy storage and supply system including a bank of power cell modules, in accordance with one embodiment.

FIG. 8 is an illustration of an energy storage and supply system 100 including a bank of power cell modules 102*a*-102*d*, according to one embodiment. With reference to FIGS. 1-8 and the descriptions of FIGS. 1-7 above, the power cell modules 102*a*-102*d* provide power to an electronic appliance 150.

In one embodiment, the bank of power cell modules 102*a*-102*d* provides power to multiple electronic appliances 150. For example, the bank of power cell modules can be configured to provide electricity to an entire home when the municipal power grid fails. In this case, the electronic appliances 150 can include lights, washing machines, dishwashers, computers, televisions, set-top boxes, DVD players, clothes dryers, ovens, toasters, garage door openers, videogame consoles, microwave ovens, or anything else in a home that typically receives power from the municipal power grid. The larger the number of power cell modules in the bank, the larger the capacity of the system 100 is to provide electricity to the home. More power cell modules means that a given appliance can be powered for a longer time, or that more electronic appliances can be powered for a particular amount of time.

In one embodiment, the bank of power cell modules 102*a*-102*d* is located at a business and is configured to provide electricity to electronic appliances at the business location.

In one embodiment, the bank of power cell modules is portable system that be taken to various locations to provide electricity to electronic appliances 150. For example, the bank of power cell modules 102*a*-102*d* can be taken camping, can be taken outdoors to power outdoor yard equipment or power tools, or can be taken to outdoor gatherings such as barbecues or parties to power electronic equipment.

In one embodiment, the energy storage and supply system 100 includes one or more alternate power sources 152. The one or more alternate power sources 152 can be coupled to the bank of power cell modules to provide power to the power cell modules or to be joined with the power cell modules in providing power to one or more electronic appliances.

In one embodiment, the power cell modules may include a charging bus. When the alternate power source 152 is connected to a charging connection of one of the power cell modules 102*a*-102*d*, the alternate power source 152 is connected to a charging bus that enables the alternate power source 152 to charge the batteries within each of the power cell modules 102*a*-102*d*.

In one embodiment, the alternate power source 152 can provide power to the multi-voltage bus 108. In this way, the alternate power source 152 supplements the power provided by the power cell modules 102*a*-102*d* in powering the electronic appliances 150. Additionally, or alternatively, the alternate power source 102 can power the electronic appliances 150 in parallel to the power cell modules 102.

In one embodiment, when the alternate power source 152 is connected into one of the power cell modules 102*a*-102*d*, the power cell module converts the voltage provided by the action power source 150 to the output voltages carried by the multi-voltage bus 108. These output voltages generated from the alternate power source 152 are connected to the corresponding lines of the multi-voltage bus 108 so that the alternate power source 152 can supplement the power provided to electronic appliances 150. Accordingly, the power cell modules 102*a*-102*d* can include dedicated ports for receiving energy from alternate power sources 152 to either charge one or more of the power cell modules or to join in the multi-voltage bus 108.

In one embodiment, the alternate power source 152 includes a generator. The generator can be a conventional combustion generator that generates electricity by combusting a fossil fuel in order to provide backup power to a location when the municipal power grid fails, or for other situations. The generator can be used to charge the power cell modules 102*a*-102*d*, or to supplement the power provided by the power cell modules 102*a*-102*d*. Utilization of a combustion fuel-based system for some portion of power output or energy storage effectively creates a "hybrid" system. Power may flow in a serialized manner or in parallel to the modules in their operation, depending on the system, the application and the component modules.

In one embodiment, the alternate power source 152 includes one or more of solar panels, wind turbines, hydropower generators, flywheels, batteries, or super capacitors. All of these power sources can be used to charge the power cell modules or to supplement the energy provided by the modular powers.

In one embodiment, the alternate power source 152 is the municipal grid. When the municipal grid is functioning properly and the bank of power cells are connected to municipal grid, the municipal power grid recharges the batteries within the power cell modules 102a-102d.

In one embodiment, the system can be plugged into a standard wall outlet of a house when the municipal power grid is interrupted and is not supplying power. A power cord can be plugged into the wall outlet from one of the power cell modules. The power cell module converts one of the DC output voltages from the multi-voltage bus into an AC voltage having the correct frequency and amplitude for the wall outlet. The AC voltage is then supplied to the wall outlet. All of the wall outlets that are on the same circuit can now be powered by the AC voltage supplied from the power cell module or bank of power cell modules. Before doing this, the user will need to access the circuit box and trip the circuit breaker to that circuit so that if the municipal power grid comes back online there will not be a short circuit. The power cell module can include protective circuitry to protect the power cell module in the event of a short circuit. The power can be supplied via a bank of power cell modules.

Figure 9:
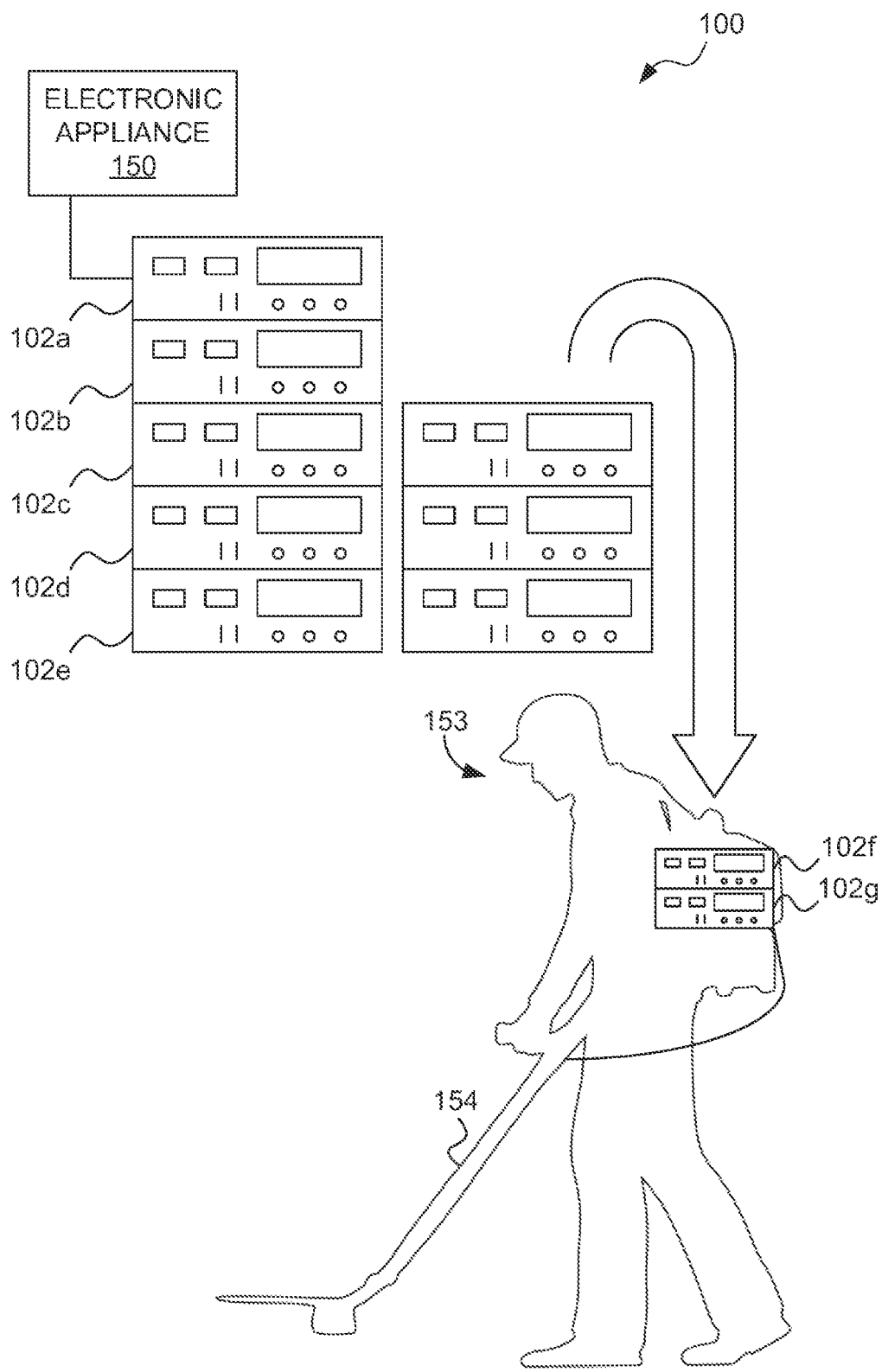
FIG. 9 is an illustration of an energy storage and supply system including power cell modules in use in a stationary and a portable situation, in accordance with one embodiment.

FIG. 9 is an illustration of an energy storage and supply system 100, according to an embodiment. With reference to FIGS. 1-10 and the descriptions of FIGS. 1-8 above, the system 100 includes a plurality of power cell modules 102a-102g. The power cell modules 102a-102g. are connected in the bank such that they collectively provide power to one or more electronic appliances 150 as described previously.

In one embodiment, power cell modules can be removed from a bank of power cells without interrupting the power provided by the bank of power cells to the electronic appliances 150. This is due in part to the multi-voltage bus that receives power from all of the power cell modules connected in a bank of power cell modules. Removing one or more power cell modules from the bank of power cell modules does not interrupt the voltage provided by the multi-voltage bus. Thus, the power provided to the electronic appliances 150 is not interrupted when one or more of the power cell modules are removed from the bank of power cell modules. Furthermore, the inter-module multi-voltage bus connectors 112 are configured such that the user can easily detach one or more of the power cell modules without the risk of receiving an electrical shock. The power cell modules may include decoupling switches or latches that the couple the power cell modules from the collective multi-voltage bus when the user operates the state decoupling switches or latches. The user may then freely remove the desired power cell modules from the bank of power cell modules.

In one embodiment, the electronic appliances 150 were being powered by the power cell modules 102a-102j. when a user 153 detached the power cell modules 102f and 102g from the bank of power cell modules. The user 153 connects an electronic yardwork tool 154 to the power cell modules 102g. The power cell modules 102f and 102g collectively power the electronic yardwork tool 154. The power cell modules 102f and 102g can be conveniently placed in a backpack worn by the user 153. The power supplied to the electronic appliances 150 is not interrupted when the user removes the power cell modules 102g and 102g.

In one embodiment, because the module or system can be made up of one or more modules the system 100 is an advantageous design; holistically, situationally, economically, sustainably, and with a more utilitarian approach than any typical systems. The system 100 has the advantage of scaling up or down depending on the specific application.

In one embodiment, the system 100 provides a plurality of energy and power cell modules comprised of a transformative power coupling bus, or multi-voltage bus, wherein the addition of any module into the system fundamentally changes the nature and functionality of the system as a whole as well as the modular components that make up the system. While each independent module serves its own function or functions with features that may be specific or shared across groups and families of similar or dissimilar modules, when combined with one or more modules a new system is created that provides greater features and function than each of the modules would have independently.

In one example, consumers can purchase batteries, but they will not be the versatile and scalable system provided in accordance with the present disclosure. The hurdle of being a battery expert limits the general population from accessing power remotely or limits them to just generators. The modular system described in accordance with principles of the present disclosure does not need to be identified at the initial purchase. Consumers can mix and match and purchase power cell systems and modules over several purchases, making a system ideal for each unique application or deployment.

In one embodiment, the system 100 utilizes energy storage and generation technologies coupled with power output devices and systems including but not limited to the following: batteries including various chemistries and configurations, capacitors, solar panels, thermal heat capture devices, wind and/or water turbines and wheels, direct DC input from motors or combustion engines linked to DC generating alternators; integrated circuits, transistors, and transformers, that may convert the stored or generated energy into DC or AC power at various voltages and frequencies; electronics intended to drive magnetic audio devices, such as speakers, monitors, tweeters; thermocoupling devices to generate or reduce heat; photon-emitting electromechanical and direct electrical photon emitting devices such as LEDs and the drivers to power similar devices. In one embodiment, the act of connecting the power cell modules creates a power system wherein the system's sum is greater than the individual modules. In one embodiment, the system 100 designed to be user friendly so anyone can take advantage of it. The components easily snap together. There is no need for specific knowledge in electricity. Unlike other electrical systems, the system 100 can be easily used by anyone. This is done by simplifying the user interface to something as easy as using a power outlet in your home. Inverters, chargers, controllers, and everything are internal to the system.

In one embodiment, the modules and the system are capable of supporting non-stackable components, either made by a same manufacturer or by disparate manufacturers and provides clear industry standard connections to assist.

This is done by using industry standard plugs and connectors. In one embodiment, there are no proprietary connectors on the system.

In one embodiment, the system eliminates the need for the end user to understand power systems, proper wiring; parallel or series connection, pairing correct voltages, balancing uneven potential energies across storage and generation components and systems. The system also protects the user from accidents that may result in a failed attempt to wire other power and energy devices.

In one embodiment, the system uses many available components. It is the use and arrangement of these components that has not be done in this manner and not been done to create a battery module with multiple voltages let alone a system of various modules that are now enabled because of the invention, and can be done so without the use of switching ICs, or other power conversion components that only add cost, and energy loss. A traditional battery will have a set amount of energy with a set voltage output, it may be comprised of multiple cells arranged together but the output and interaction remain the same. This system allows for simple methods for multiple energy levels and voltages depending on the specific application. This system solves many different portable power problems within one system. Different voltages and energy levels can easily be selected. This is done by a unique wiring connection system inside the casing of the power cell module. The battery case has 4 or more separate batteries inside it. If a higher voltage is needed, select batteries are wired in series. If a lower voltage is needed the wiring configuration would be wired in parallel. In one embodiment, the selection of voltage is safely decided on the outside of the case with a manual selector switch that will change the wiring architecture inside the case.

In one embodiment, the system provides information to the user about the state of the modules and the system. Independent modules may also display relevant information regarding the state or condition of the module. In some embodiments, the information systems may be capable of supporting some of the following while not being limited to wired (canbus, SCADA), wi-fi, radio, mobile (cellular, ZigBee, Bluetooth). The easiest option would be to plug a cellular air card to the battery through the USB port. This would allow the system to be uploaded to any cloud database or Internet of Things database. The system would be capable of incorporating these communication protocols to make for integrated IOT power devices and remote monitoring.

In one embodiment, modules with more energy may be safely added during operation or in a powered off setting. Modules may be safely removed during operation or in a powered off setting. No wires are touched. No safety equipment is required to add or remove modules. It is as simple as unlatching the module and lifting the top from the bottom. The voltages and the connections used mean this can be done safely and per code even when powered up.

In one embodiment, modules from a small system powering a light, speaker, television, recharging a mobile phone can be used together to provide the energy to power larger appliances, and in turn can be used with larger modules intended to power multiple large appliances can be used together with similar or smaller units.

In one embodiment, power cell modules can be used independently to provide direct DC power to handheld or fixed power requirements/devices. These modules can in some instances be mounted to backpack or similar personal harness to allow the user to power DC devices while maintaining the use of their hands. Such a harness or backpack could also support an energy or battery module that is also connected to another power generation or output device. Such a power output device which is not limited to, but may provide AC power if connected to an energy or battery module, would be capable of powering a multitude of household appliances. This apparatus would thereby make these household appliances operate beyond their standard constraints of the length of a cord, and therefore transforming the nature of these appliances from grid tethered to mobile. A power module, and perhaps, a control/head unit would be attached to a backpack assembly. This will free up both hands but allow the battery power to be there for immediate access. No need for any cords.

In one embodiment, some modules may be DC power modules and others may be AC power modules.

In one embodiment, a power cell module, and thereby the system it may be connected to, with either event driven or remotely "triggered" operation is described: The event might be a temperature threshold, for example if the module detects that the temperature it is monitoring has changed such that it triggers the module to begin an action or series of actions. Unlike a typical combustion fueled generator the system may use very little to no energy "waiting" for an event to occur at which point energy can flow to the module as it is needed, not wasting energy. The system could also utilize a remote start function to trigger a generator, for many purposes. Remote start switches are readily available in the market. Installing one of these with our battery systems will allow us to install our systems in remote applications with intermittent power draw. The switch would allow power to be discharged only exactly when it is called upon.

In one embodiment, a power output module is capable of delivering the power from different modules composed of different chemistries, fuel sources, and in series with power capture technologies. A system that can utilize two or more different types of chemistries would be a system that is called 'chemistry agnostic' to those with industry knowledge, a power module may or may not have the ability to utilize energy modules of one or more different type of chemistry, but also fuel composition, and not only stored "potential" energy resources but real-time captured or captured stored and then transmitted energy.

In one embodiment, the modules may provide multiple voltages in various currents and frequencies. Traditionally multiple voltages can be accomplished utilizing integrated circuits to switch voltage or other electromechanical or electrochemical components to transform voltage, similarly with the current and if required, frequency. The modules utilize an advanced connection scheme called the multi-voltage bus. In one embodiment, the multi-voltage bus is present on all modules and provides the primary means for modules to electrically connect to each other and is one of several mechanisms that physically guide the user to correctly orient the module to another for the desired output voltage.

In one embodiment, there are many ways to achieve multiple voltages, one method is detailed in a wiring schematic showing 4 traditional batteries arranged in 3 configurations with 3 different voltages available on the multi-voltage bus. By arranging the traditional batteries in this configuration, other modules connected to the battery may provide only one operating voltage, but the energy is thus transformed throughout the entirety of the system.

In one embodiment, a power cell module may utilize one or all of the multi-voltage bus lines available depending on the purpose of the module. Regardless of the module utilizing one or all of the multi-voltage bus lines subsequent modules can interconnect and electrical flow between modules is maintained. In one embodiment, a first power cell module is capable of utilizing all multi-voltage lines. Second, third, and fourth power cell modules are energy storage modules each with different total capacity providing access to energy on each line of the multi-voltage bus without the need for (although it may utilize) transformers, switching circuits or similar components.

In one embodiment, a power capture module can be added anywhere to the system. The power capture module can be a "solar" capture device, whose panels produce a voltage that fits multi-voltage bus line 3. While the power capture module may be capable of providing various voltages, utilizing such switching electronics described above, and it may or may not need these to deliver at least one voltage compatible with the multi-voltage bus, it is more common, simple, and cost effective for the solar system to provide one voltage out, in this example line 3 on the multi-voltage bus line. Because there are power cell modules capable of accepting the multi-voltage bus line the power generated from the power capture module transformed through the system to provide power on all the multi-voltage bus lines, the electrons that went out on multi-voltage bus line 3 are now capable of flowing through all lines without requiring the common transforming technologies.

In one embodiment, the multi-voltage bus may employ several means by which to detect or become 'aware' of operational parameters of the various multi-voltage bus lines, allowing a module with a smart multi-voltage bus to drop in or out. The smart multi-voltage bus makes it so the electron flow may continue uninterrupted between modules even if the module with a smart multi-voltage bus determines it should drop out of one or all of the possible multi-voltage bus lines. There may or may not be the availability of an override trigger either physical or electrically controlled allowing a user to momentarily reset the Smart multi-voltage bus.

In one embodiment, electrical protection between modules and across the system for components, the user and the environmental safety can be important. Safety components such as fuses, breakers, shunts and diodes may be used to buffer and protect the module and its components from unplanned events internal or external.

There may be additional function achieved when multiple modules are capable of sharing one or more of the multi-voltage bus lines in parallel and one or more multi-voltage bus lines in series. In one embodiment, the multi-voltage bus line system may support multiplexing one or more lines in a series connection, adding the voltage between modules. This serial multiplexing adjusts the physical connection between modules operating on the multi-voltage bus. The physical shift can occur in multiple ways, exclusively within the electro-mechanics, outside of the multi-voltage bus mechanics or a combination of the two. This serial connection can be achieved utilizing contactors, IGBTs, and relays as one embodiment.

In one embodiment, the need for portable power can occur in unplanned non-ideal events, many of which may take place during or involving automotive or similar vehicular transportation. Power cell modules may be capable of capturing power from a vehicle's alternator or other cabin power system. The module may direct wire or use standard connections such as the "cigarette" plug to capture power. Depending on the wiring configuration this may occur when the alternator or cabin power is running, or it may be on constantly. Such a module or system if properly charged or maintained by the vehicle's cabin power can provide energy back to the vehicle if the vehicle's starter battery is not capable of providing the necessary power. A module or system is thereby also available to provide its other power and energy functions in an emergency or non-emergency event.

In one embodiment, a power cell module or series of power cell modules in a system, that may or may not be utilizing a multiplexing serial multi-voltage bus, may have enough energy to power a traction motor or integrated circuits and systems capable to drive a motor. The module or modules would also be capable of capturing energy through regenerative braking or other kinetic energy harvesting methods.

In one embodiment, each module is enclosed in an external shell to protect the components from common or if specifically listed harsh environments. These enclosures may differ from one another in appearance and function if so required of the enclosure. The differing functions include but are not limited to some of the following: easy opening to remove, expand, access parts or components that may be inside or may adjust. The enclosure may contain additional smaller modules that may or may not act independently from the module itself and from the system but when recombined in various, purposely designed methods and connections result in new or similar features and functions.

In one embodiment, while the appearance of a power cell module may or may not differ between similar or dissimilar modules there are several features that may or may not be present in all or some modules these include but are not limited to; devices to securely and physically latch or connect one module to another/depending on the module there may not be a means to latch or secure other than the tension connection made with the multi-voltage bus, a device or method to protect or to limit physical damage to the module, system or specific components or parts of the module or system, devices and methods to assist an individual in aligning modules for simple and easy connection, a device to carry/wheel or otherwise move a single or multiple modules, a means and method to add a further shell/housing/protective covering that may have a specific intended purpose beyond the protections of the enclosure this purpose may be for physical, aesthetic, transportational, electrical or another function not described.

In one embodiment, while combustion fuels may have limited appeal in what is generally envisioned and described often as a 'battery' based system, combustion fuels can be used in such a stackable system. The motor or other means of converting the fuel source into electrical energy may be triggered in some fashion, remotely, event-driven or by other means of interaction. The energy storage and supply system may have the ability to stop or restart the process. Utilization of a combustion fuel-based system for some portion of power output or energy storage effectively creates a "hybrid" system. Power may flow in a serialized manner or in parallel to the modules in their operation, depending on the system, the application and the component modules.

FIG. 10A is a block diagram of internal circuitry of a power cell module I02, in accordance with one embodiment. In particular, FIG. 10A illustrates a portion of the voltage combination circuitry I06 in accordance with one embodiment. The voltage combination circuitry 106 includes a plurality of relays 160a1-d1. Each relay 160a1-d1 includes a positive and a negative terminal coupled to the positive and negative terminal of a respective battery 104a-d. The relays 160a1-d1 are configured to receive the battery voltages and output the output voltage v1. The relays 160a1-d1 are coupled to and controlled by a control circuitry 110 to selectively provide or not provide the output voltage v1. In the example of FIG. 10A, the batteries 104*a-d* are 12 V batteries and the output voltage VI is 12 V. While FIG. 10A shows four sets of output terminals each outputting the output voltage VI, in practice the output voltage VI can be output from a single set of a positive and negative terminals.

Figure 10B:
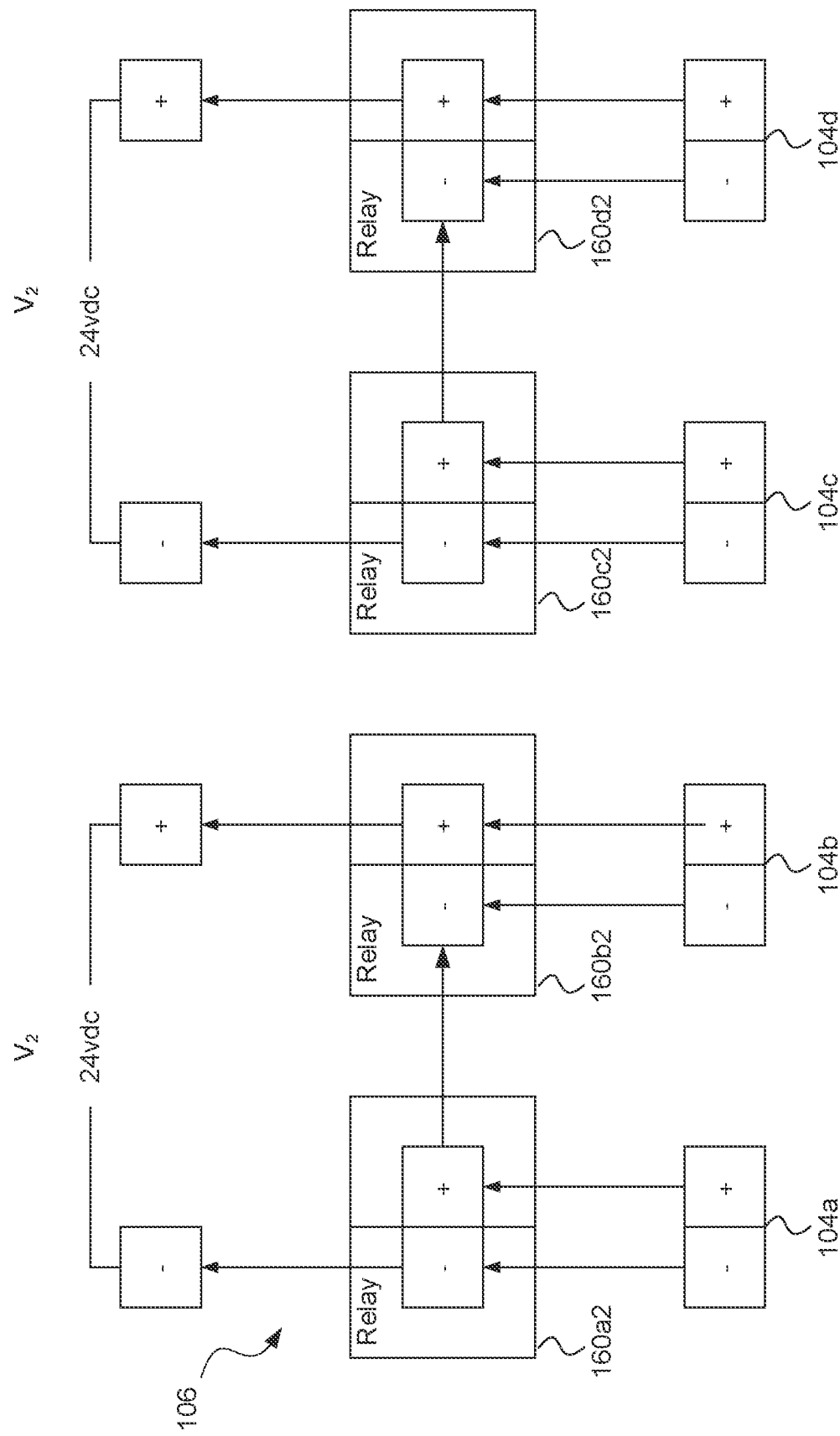
FIG. 10B is a block diagram of internal circuitry of a power cell module, in accordance with one embodiment.

FIG. 10B is a block diagram of internal circuitry of a power cell module 102, in accordance with one embodiment. In particular, FIG. 10B illustrates a portion of the voltage combination circuitry 106, in accordance with one embodiment. The voltage combination circuitry 106 includes a plurality of relays 160*a*2-*d*2. Each relay 160*a*2-*d*2 includes a positive and a negative terminal coupled to the positive and negative terminal of a respective battery 104*a-d*. The relays 160*a*2-*d*2 are configured to receive the battery voltages and to output the output voltage V2. The relays 160*a*2-*d*2 are coupled to and controlled by a control circuitry 110 to selectively provide or not provide the output voltage V2. In the example of FIG. 10B, the batteries 104*a-d* are 12 V batteries and the output voltage V2 is 24 V. While FIG. 10B shows two sets of output terminals each outputting the output voltage V2, in practice the output voltage V2 can be output from a single set of a positive and negative terminals.

FIG. 10C is a block diagram of internal circuitry of a power cell module 102, in accordance with one embodiment. In particular, FIG. 10C illustrates a portion of the voltage combination circuitry 106, in accordance with one embodiment. The voltage combination circuitry 106 includes a plurality of relays 160*a*3-*d*3. Each relay 160*a*3-*d*3 includes a positive and a negative terminal coupled to the positive and negative terminal of a respective battery 104*a-d*. The relays 160*a*3-*d*3 are configured to receive the battery voltages and to output the output voltage V2. The relays 160*a*3-*d*3 are coupled to and controlled by a control circuitry 110 to selectively provide or not provide the output voltage V3. In the example of FIG. 10B, the batteries 104*a-d* are 12 V batteries and the output voltage V3 is 48 V. While FIG. 10B shows two sets of output terminals each outputting the output voltage V3, in practice the output voltage V3 can be output from a single set of a positive and negative terminals.

In one embodiment, the voltage combination circuitry 106 includes the relays 160*a*1-*d*1, the relays 160*a*2-*d*2, and the relays 160*a*3-*d*3 all coupled to the batteries 104*a-d*. The 160*a*1-*d*1, the relays 160*a*2-*d*2, and the relays 160*a*3-*d*3 can simultaneously provide the output voltages VI, V2, and V3 to the multi-voltage bus 108. Additionally, the control circuitry 110 can control the relays to selectively provide any, all, or none of the voltages VI, V2, and V3.

FIG. 11 illustrates a flow diagram of a process 1100, according to various embodiments.

Referring to FIG. 11 and the description of FIGS. 1-10 above, in one embodiment, process 1100 begins at BEGIN 1102 and process flow proceeds to ELECTRICALLY CONNECT MULTIPLE POWER CELL MODULES TOGETHER IN A BANK OF POWER CELL MODULES 1104.

In one embodiment, at ELECTRICALLY CONNECT MULTIPLE POWER CELL MODULES TOGETHER IN A BANK OF POWER CELL MODULES 1104, multiple power cell modules are electrically connected together in a bank of power cells, using any of the methods, processes, and procedures discussed above with respect to FIGS. 1-10.

In one embodiment, once multiple power cell modules are electrically connected together in a bank of power cell modules at ELECTRICALLY CONNECT MULTIPLE POWER CELL MODULES TOGETHER IN A BANK OF POWER CELL MODULES 1104, process flow proceeds to FORM, BETWEEN THE POWER CELL MODULES, A COLLECTIVE MULTI-VOLTAGE BUS CARRIED BY EACH OF THE POWER CELL MODULES 1106.

In one embodiment, at FORM, BETWEEN THE POWER CELL MODULES, A COLLECTIVE MULTI-VOLTAGE BUS CARRIED BY EACH OF THE POWER CELL MODULES 1106, a collective multi-voltage bus is formed, between the power cell modules, carried by each of the power cell modules, using any of the methods, processes, and procedures discussed above with respect to FIGS. 1-10.

In one embodiment, once a collective multi-voltage bus is formed, between the power cell modules, carried by each of the power cell modules at FORM, BETWEEN THE POWER CELL MODULES, A COLLECTIVE MULTI-VOLTAGE BUS CARRIED BY EACH OF THE POWER CELL MODULES 1106, process flow proceeds to RECEIVE, IN A USER POWER OUTPUT PORT OF A FIRST POWER CELL MODULE OF THE BANK OF POWER CELL MODULES, AN ELECTRICAL CONNECTOR FROM AN ELECTRONIC APPLIANCE 1108.

In one embodiment, at RECEIVE, IN A USER POWER OUTPUT PORT OF A FIRST POWER CELL MODULE OF THE BANK OF POWER CELL MODULES, AN ELECTRICAL CONNECTOR FROM AN ELECTRONIC APPLIANCE 1108, an electrical connector from an electronic appliance is received, in a user power output port of a first power cell module of the bank of power cell modules, using any of the methods, processes, and procedures discussed above with respect to FIGS. 1-10.

In one embodiment, once an electrical connector from an electronic appliance is received, in a user power output port of a first power cell module of the bank of power cell modules at RECEIVE, IN A USER POWER OUTPUT PORT OF A FIRST POWER CELL MODULE OF THE BANK OF POWER CELL MODULES, AN ELECTRICAL CONNECTOR FROM AN ELECTRONIC APPLIANCE 1108, process flow proceeds to PROVIDE, VIA THE USER POWER OUTPUT PORT, POWER TO THE ELECTRONIC APPLIANCE COLLECTIVELY FROM EACH OF THE POWER CELL MODULES IN THE BANK VIA THE COLLECTIVE MULTI-VOLTAGE BUS 1110.

In one embodiment, at PROVIDE, VIA THE USER POWER OUTPUT PORT, POWER TO THE ELECTRONIC APPLIANCE COLLECTIVELY FROM EACH OF THE POWER CELL MODULES IN THE BANK VIA THE COLLECTIVE MULTI-VOLTAGE BUS 1110, power to the electronic appliance is provided, via the user power output port, collectively from each of the power cell modules in the bank via the collective multi-voltage bus, using any of the methods, processes, and procedures discussed above with respect to FIGS. 1-10.

In one embodiment, once power to the electronic appliance is provided, via the user power output port, collectively from each of the power cell modules in the bank via the collective multi-voltage bus at PROVIDE, VIA THE USER POWER OUTPUT PORT, POWER TO THE ELECTRONIC APPLIANCE COLLECTIVELY FROM EACH OF THE POWER CELL MODULES IN THE BANK VIA THE COLLECTIVE MULTI-VOLTAGE BUS 1110, process flow proceeds to END 1012.

In one embodiment, at END 1112 the process is exited to await new data and/or instructions.

As noted above, the specific illustrative examples discussed above are but illustrative examples of implementations of embodiments of the energy storage and supply system. Those of skill in the art will readily recognize that other implementations and embodiments are possible. Therefore, the discussion above should not be construed as a limitation on the claims provided below.

In one embodiment, a power cell module includes a casing, multiple batteries disposed within the casing. And voltage combination circuitry disposed within the casing and including multiple voltage outputs each corresponding to a respective serial connection of the multiple batteries, a parallel connection of the multiple batteries, or a combination of serial or parallel connections of the multiple batteries. The power cell module includes a multi-voltage bus receiving the multiple voltage outputs from the voltage combination circuitry and including a line for each voltage output. The power cell module includes multi-voltage bus connectors configured to attach the casing to a second power cell module and to electrically connect each line of the multi-voltage bus to a corresponding line of a multi-voltage bus of the second battery pack.

In one embodiment, a power cell module system includes a first power cell module. The first power cell module includes multiple first batteries, a first multi-voltage bus simultaneously carrying multiple voltages each on a respective line of the first multi-voltage bus, and first inter-module multi-voltage bus connectors. The power cell module system includes a second power cell module including multiple second batteries and a second multi-voltage bus simultaneously carrying multiple output voltages each on a respective line of the second multi-voltage bus. The power cell module system includes second inter-module multi-voltage bus connectors configured to attach to the first inter-module multi-voltage bus connectors of the first power cell module by stacking the second power cell module on the first power cell module, thereby forming a collective multi-voltage bus from the first and second multi-voltage busses in which each line of the first multi-voltage bus is in electrical contact with a corresponding line of the second multi-voltage bus. In one embodiment, a method includes electrically connecting multiple power cell modules together in a bank of power cells, forming, between the modules, a collective multi-voltage bus carried by each of the power cell modules, and receiving, in a user power output port of a first power cell module of the bank of power cell modules, an electrical connector from an electronic appliance. The method includes providing, via the user power output port, power to the electronic appliance collectively from each of the power cell modules in the bank via the collective multi-voltage bus.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing". "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

The invention claimed is:

1. A modular power-cell system, comprising:
   a first power-cell module including
      a first casing having top and bottom surfaces,
      first batteries disposed within the casing,
      a first voltage-combination circuit disposed in the first casing and configured to couple the first batteries together to generate first-power-cell-module-bus voltages including a first bus voltage and to bypass at least one of the first batteries to generate a second bus voltage as one of the first-power-cell-module-bus voltages,
      a first multi-voltage bus disposed in the first casing and having lines and simultaneously carrying each of the first-power-cell-module-bus voltages on a respective one of the lines,
      first inter-module multi-voltage bus connectors disposed on the top and bottom surfaces and respectively coupled to the lines of the first multi-voltage bus,
      a first user output-power port disposed in the first casing and configured to carry a third bus voltage from one of the lines of the first multi-voltage bus and configured to connect to and to supply power to a first electronic appliance,
      a second user output-power port disposed in the first casing, configured to carry a first output voltage, and configured to connect to and to supply power to a second electronic appliance, and
      a first voltage-conversion circuit disposed in the first casing and configured to generate the first output voltage from either the first bus voltage or the second bus voltage.

2. The modular power-cell system of claim 1, further comprising:
   a second power-cell module including
      a second casing having top and bottom surfaces,
      second batteries disposed within the second casing,
      a second multi-voltage bus disposed within the second casing and having lines and configured to carry, simultaneously, the first power-cell-module-bus voltages each on a respective one of the lines, and
      second inter-module multi-voltage bus connectors located on the top and bottom surfaces of the second casing, respectively coupled to the lines of the second multi-voltage bus, and respectively coupled to the first inter-module multi-voltage bus connectors.

3. The modular power-cell system of claim 1 wherein:
   at least two of the first batteries are series connected; and
   the voltage-combination circuit is configured to bypass at least one of the first batteries by replacing at least one of the series-connected batteries with a low-impedance path to generate the second bus voltage.

4. The modular power-cell system of claim 1 wherein:
   at least two of the first batteries are series connected; and
   the voltage-combination circuit is configured to bypass at least one of the first batteries by placing a low-impedance path across at least one of the series-connected batteries to generate the second bus voltage.

5. The modular power-cell system of claim 1 wherein:
   at least two of the first batteries are parallel connected; and
   the voltage-combination circuit is configured to bypass at least one of the first batteries by opening a connection to a terminal of at least one of the parallel-connected batteries to generate the second bus voltage.

6. The modular power-cell system of claim 1 wherein the first output voltage is different from each of the first power-cell-module-bus voltages.

7. The modular power-cell system of claim 1 wherein the first output voltage is a DC voltage.

8. The modular power-cell system of claim 1 wherein the first output voltage is an AC voltage.

9. The modular power-cell system of claim 1 wherein the first voltage-combination circuit includes a relay circuit that is configured to couple the first batteries together to generate the first-power-cell-module-bus voltages including the first bus voltage and to bypass the at least one of the first batteries to generate the second bus voltage.

10. The modular power-cell system of claim 1, further comprising at least one circuit breaker disposed within the first casing and coupled between the first voltage-combination circuit and the first multi-voltage bus.

11. The modular power-cell system of claim 1, further comprising a first control circuit disposed in the first casing and coupled to at least one of the first voltage-combination circuit, the first and second user output ports, or the first voltage-conversion circuit.

12. A non-transient computer-readable medium storing instructions that when executed by a control circuit, cause the control circuit, or another circuit or apparatus coupled to the control circuit:

to couple together first batteries disposed in a first casing of a first power-cell module to generate, on a first multi-voltage bus disposed in the first casing, first-power-cell-module-bus voltages including a first bus voltage;

to bypass at least one of the first batteries to generate, as one of the first-power-cell-module-bus voltages, a second bus voltage;

to convert the first bus voltage or the second bus voltage to a first output voltage that is different from any of the first-power-cell-module-bus voltages;

to couple the first output voltage to a first user output-power port disposed in the first casing and configured to connect to and to supply power to a first electronic appliance; and to coupling one of the first-power-cell-module-bus voltages to a second user output-power port configured to connect to and to supply power to a second electronic appliance.

13. The non-transient computer-readable medium of claim 12, further comprising:

wherein at least two of the first batteries are series connected; and to bypass at least one of the first batteries includes to replace at least one of the series-connected batteries with a low-impedance path, or to place a low-impedance path across at least one of the series-connected batteries, to generate the second bus voltage.

* * * * *